US011862136B2

(12) United States Patent
Huang et al.

(10) Patent No.: US 11,862,136 B2
(45) Date of Patent: Jan. 2, 2024

(54) ACOUSTIC METAMATERIAL UNITS WITH THE FUNCTION OF SOUNDPROOF, FLOW PASSING AND HEAT; TRANSFER ENHANCEMENT, THE COMPOSITE STRUCTURE AND THE PREPARATION METHODS THEREOF

(71) Applicant: Lifan Huang

(72) Inventors: Lifan Huang, Shanghai (CN); Shuguang Wang, Shandong (CN)

(73) Assignee: COMPONENT TECHNOLOGIES, L.L.C., Burnsville, MN (US)

(*) Notice: Subject to any disclaimer, the term of this patent is extended or adjusted under 35 U.S.C. 154(b) by 1085 days.

(21) Appl. No.: 16/626,962

(22) PCT Filed: Apr. 19, 2016

(86) PCT No.: PCT/CN2016/079655
§ 371 (c)(1),
(2) Date: Dec. 27, 2019

(87) PCT Pub. No.: WO2017/181341
PCT Pub. Date: Oct. 26, 2017

(65) Prior Publication Data
US 2020/0143784 A1 May 7, 2020

(51) Int. Cl.
*E04B 1/86* (2006.01)
*G10K 11/168* (2006.01)
(Continued)

(52) U.S. Cl.
CPC .......... *G10K 11/168* (2013.01); *E04F 13/075* (2013.01); *G10K 11/04* (2013.01); *G10K 11/172* (2013.01); *E04F 13/0867* (2013.01)

(58) Field of Classification Search
CPC .... G10K 11/168; G10K 11/04; G10K 11/172; E04F 13/075; E04F 13/0867
(Continued)

(56) References Cited

U.S. PATENT DOCUMENTS

2018/0114516 A1* 4/2018 Hakuta ................ B32B 15/043

* cited by examiner

*Primary Examiner* — Ammar T Hamid
(74) *Attorney, Agent, or Firm* — Gutwein Law; Tyler B. Droste

(57) ABSTRACT

The present invention relates to the acoustic metamaterial structural unit with the function of soundproof, flow-passing and heat-transferring enhancement, which comprises a frame, a constraint placed in the frame and a piece of membrane covering at least one surface of the frame; both the frame and the membrane are respectively placed at least one hole. Besides, the present invention also provides the acoustic metamaterial composite plate and the composite structure constructed with the acoustic metamaterial structural unit; the method for adjusting the frequency and the assemble method. The present structural unit possesses better soundproof property than the routine perforated plated or micro-perforated plate in broad operating frequency. And also the enough heat flow, gas flow or fluid flow can pass through smoothly. The diffuse efficiency of the heat energy of the mediums on both sides of the hole is increased by the vibration of the self-structure under the excitation of the soundwave and further the efficiency of heat exchange is accelerated. The method for assembling the acoustic metamaterial composite structure with the acoustic metamaterial structural units is simple. The operation performance is steady.

18 Claims, 20 Drawing Sheets

(51) Int. Cl.

| | |
|---|---|
| ***E04F 13/075*** | (2006.01) |
| ***G10K 11/172*** | (2006.01) |
| ***G10K 11/04*** | (2006.01) |
| *G10K 11/28* | (2006.01) |
| *E04F 13/08* | (2006.01) |

(58) Field of Classification Search

USPC .................................................. 181/284, 175

See application file for complete search history.

(a)

(b)

(c)

(a)

(b)

ACOUSTIC METAMATERIAL UNITS WITH THE FUNCTION OF SOUNDPROOF, FLOW PASSING AND HEAT; TRANSFER ENHANCEMENT, THE COMPOSITE STRUCTURE AND THE PREPARATION METHODS THEREOF

TECHNICAL FIELD

The present invention relates to an acoustic metamaterial unit cell with the function of soundproof and flow-passing, and the array composite structure comprises thereof. It can increase the diffuse efficiency of the heat energy and accelerate the efficiency of convection and heat exchange. The unit cell is fit for manufacturing the structural shell, the soundproof plate, the soundproof hood or the muffler, which can make these devices have the light and thin structure, perform good soundproof in low frequency and also can ensure the enough quantity of heat flow, gas flow or liquid flow pass through smoothly. The present invention belongs to the field of materials.

This invention provides an acoustic metamaterial unit cell, consisting of a frame, a constraint stick placed in the frame and a piece of membrane covering at least one surface of the frame. This invention also provides an acoustic metamaterial plate comprised of the provided unit cells and a composite structure of acoustic materials. Additionally, the invention provides a method to design the operating frequency bands by modifying the structure and material properties of the frame, the constraint stick and the membrane in the proposed acoustic metamaterial. The proposed structure shows a priority in fabrication, stability and service life.

BACKGROUND ART

In order to assure the equipment running normally, the shells structure of the thermal power equipment such as steam engine, internal combustion engine, gas generator turbine, large motor, mainframe computer, electric apparatus, refrigeration equipment and etc. require high performances for the heat-dissipating and flow-passing. In the meanwhile, they also need to reduce the noise so as to prevent the noise pollution.

In order to reconcile the contradictions between the high performance of heat-dissipating and flow-passing and the soundproofing for preventing the noise pollution, the routine technical solution in the prior art is that the device for heat-dissipating and flow-passing is installed on the structural shells or the coated soundproofing cover. (Chinese patent applications are published by CN2411327Y, CN1710239A, CN200943422Y, CN104153695A, CN204099057U in China). However, the additional device for heat-dissipating and flow-passing comprises longer flow passages, and even the power equipment such as fan, pump and etc. are need to install to increase the convection. These flow-passages and power equipment not only increase the complexities of system and the cost of manufacture and maintenance, but also produce the flow passages and machinery noise. The other technical solution that is low-cost and easily implemented is that the common perforation plate or grate plate with the area of the pore large enough are used for manufacturing the shells or soundproofing cover. However, all these structures have very poor soundproof performance in medium- to low-frequency (such as lower than 1000 Hz) which is the main frequency of the electromechanical noise.

Micro-perforated panel whose diameter is less than 1 mm matched with the back panel by a certain interval can produce higher acoustic insulation mass in medium- or high-frequency. The work mechanism is stated as follows: the chamber between the micro-perforated panel and the back panel forms Helmholtz Resonant Absorber. When the frequency of the incoming sound wave is consistent with the special frequency of the Helmholtz Resonant Absorber, resonance friction happens between the gas flow and the chamber structure, which result a great lot of sound energy is converted into heat energy and the energy is further dissipated, and the absorbing sound effect of the resonant frequency is increased. Due to the above-mentioned work mechanism, the back panel is necessary if the micro-perforated panel is used for reducing the noise so as to reach the satisfied result (Chinese patent applications are published by CN101645263B, CN202986208U, CN102543061B, CN102077272B, CN102842303B, CN104700827A, CN105065337A, CN105222474A; American patent applications are published by U.S. Pat. No. 6,868,940,B1, US20110100749A1,US008381872B2, US008469145B2). Inevitably, the installment of back panel affects the effect of the heat-dissipating and flow-passing.

Besides, an air passage type soundproof window that is used in the living room of the building was disclosed on periodicals of American Institute of Physics <AIP Advances> in 2014 (2014, Sang-Hoon Kin etc., Air Transparent Soundproof Window, *AIP Advances* 4, 117123. American patent application: US20160071507A1). The mechanism of the air passage type soundproof window for increasing the quality of soundproof is similar with the mechanism that the energy is consumed by the resonant chamber of the micro-perforated panel. The air passage type soundproof window is the array structure comprising the resonance chamber acoustics unit with the cylinder hole. Wherein, the maximum diameter of the hole for air passage is 50 mm; the length of the resonance chamber acoustics unit side made of the material of rigid acrylic is 150 mm; the thickness is 40 mm; and the lowest resonance frequency is about 1000 Hz. Under the situation, the soundproof effect can be reached and is better than the micro-perforated panel in the medium- to low-frequency. However, in order to realize the effective soundproof in lower frequency, the size of the structure must be very large, which results it is hard to use in the occasions whose sizes requirement is strict. More important, the flow passing through the holes decreases the soundproof effect of all frequencies, especially in low frequency whose wavelength is greater than the diameter of the hole.

The appearance of the acoustic metamaterial, especially the membrane-type acoustic metamaterial (2008, Z. Yang etc., Membrane-Type Acoustic Metamaterial with Negative Dynamic Mass, *Physical Review Letters* 101, 204301.) makes the light and thin structure block the broadcast of the low frequency soundwave effectively, wherein the thickness and size of the unit cell of the light and thin structure is less than the wavelength of soundwave by two orders of magnitude, i.e., the structure in size of centimeter grade can be used for blocking the noise whose frequency is about hundred Hz and wavelength is in meter grade. The membrane-type acoustic metamaterial is based on the mechanism of locally resonant principle (2000, Zhengyou Liu etc., Locally Resonant Sonic Materials, *Science* 289, 1734. The typical structure comprises three structure units, i.e., a rigid frame, an elastic membrane and a mass. The main work mechanism is that the whole plate is divided into small, disconnected and relatively independent regions by the rigid frame, and thus the whole plate can generate strongly resonant vibration in every region due to the oscillation effects of the mass-membrane or mass-filler system excited by the incidence of sound waves. This locally resonant phenomenon can lead to a zero sum of the normal displacements of the unit cell at specific frequencies, which means that no sound wave is transmitted through the unit cell, or the incident sound waves are totally reflected. On the basis of the mechanism, the membrane-type acoustic metamaterial all require the structure should be impermeable as a whole (Chinese patent applications are published by CN1664920A, CN103996395A, CN103594080A, CN103810991A, CN104210645A, American patent applications are published by US007395898B2, US20130087407A1, US20150047923A1), which is certain to restrict the membrane-type acoustic metamaterial to use in the occasions that the requirement of heat-dissipating and flow-passing is high.

A paper (Guancong Ma etc., Low-frequency Narrow-band Acoustic Filter with Large Orifice, *Applied Physics Letters* 103, 011903.) issued in American Applied Physics Letters in 2003 firstly mentioned the membrane-type acoustic metamaterial with holes (American Application is published by US20160027427A1, Chinese Application is published by CN105122348A). A hole for heat-dissipating and flow-passing exists in the middle of the structure of the membrane-type acoustic metamaterial, and four impermeable masses are closely distributed around the hole. Under the certain acoustic frequency, strong local resonance is formed between the masses and the elastic membrane of the unit cell of the acoustic metamaterial, which counteracts the sound pressure of the soundwave passing through the hole, and the effective soundproof is realized in the certain frequency. However, the frequency band for the effective soundproof is narrow, only dozes of Hz. The present applicant analyses reasons as follows, the acoustic metamaterial cell unit can produce enough quantity of reverse soundwave to counteract the far field of the soundwave passing through the hole, only when the resonant band is near the resonant frequency

DISCLOSURE OF THE INVENTION

The technical problem solved by the present invention is to provide a technical solution that can simultaneously overcome both the defect that the structure of the membrane-type acoustic metamaterial is impermeable and the defect that the operating frequency band of the permeable acoustic metamaterial is too narrow in the prior art. Further, the present invention provides an acoustic metamaterial unit that the effect of both soundproof in board frequency and the heat-dissipating and flow-passing is good. The soundproof performance is good in broad operating frequency which is main frequency bond of the electro-mechanical noise such as hundreds of Hz, which may ensure the enough quantity of heat flow, gas flow or liquid flow pass smoothly.

The present invention also provides an acoustic metamaterial unit that can improve the heat-transfer performance. On the one hand, the diffuse efficiency of the heat energy of the mediums on both sides of the hole is increased by the vibration of the self-structure under the excitation of the soundwave, on the other hand, when the flow is passing, the vibration of the units may prevent the formation of the heat boundary layer and the speed boundary layer, and can further increase the turbulence intensity of the fluid on the wall of the heat resource and accelerate the efficiency of heat exchange. In the meanwhile, the high soundproof quantity may be realized by the cancellation between the soundwave passing through the hole and the rebound soundwave. Finally, the effect of the soundproof, flow-passing and heat-transferring enhancement is realized.

The present invention also provides an array composite structure of the acoustic metamaterial unit. The effective operating frequency band of the composite structure is significantly widened by the inner combination and splices or the outer vertical stack of the acoustic metamaterial.

In particular, the present invention provides following technical solutions.

An acoustic metamaterial structural unit comprises a frame, a constraint placed in the frame and a piece of membrane covering at least one surface of the frame; both the frame and the membrane are respectively placed at least one hole.

The constraint is rigidly connected to the frame. The flexible membrane with hole(s) covers the top and bottom surfaces of frame and is constrained by the constraint. The said frame is finally formed the closed structure, in which the constraint is placed. At least one surface of the top and bottom surfaces of the frame is covered with the membrane.

Wherein, at least one perforated constraint is placed inside of the frame.

Wherein, the shape, position, and size of the holes in the constraint is different from or same as the holes in the membrane. Preferably, the shape, position, and size of the hole in the constraint is same as the hole in the membrane.

Wherein, the size of the hole in the constraint is determined by the flow rate passing through the hole and the soundproof operating frequency bond.

Generally speaking, during determining the size of the hole, both the flow rate passing through the hole and the soundproof operating frequency bond are considered. For example, in the occasions requiring high flow-passing efficiency, the size of the hole should be big enough so as to reduce the loss of the flow rate and the influence of the pressure reduction. In the occasions that the soundproof operating frequency bond approaches the low frequency, under the precondition that the geometric size and the material parameters of the membrane is not changed, the hole in small size may make the soundproof operating frequency bond approach the low frequency.

Wherein, the shape of the hole in the constraint is regular symmetric geometry; preferably, the shape is round.

Wherein, both the top and bottom surfaces of frame are covered by the perforated membrane.

Preferably, the thickness and material of the perforated membrane covered on the top and bottom surfaces of frame is different. When the thickness and the materials of the membrane is different, it is beneficial to widen the frequency bond.

The perforated constraint is flush with at least one surface of the frame.

Wherein, porous materials can be filled in the space which is naturally formed by the two layers of the top and bottom membranes. Preferably, the porous materials are glass fiber, open and closed holes of foam.

Wherein, the shape of the frame makes the maximum area ratio of the structural unit for periodic extending is realized. Preferably, the shape is regular, square or hexagons.

Wherein, the constraint contacts the membrane by the linear contact or surface contact.

Preferably, the shape formed by the contact is regular symmetric geometry. Preferably, the shape is spherical, square or regular polygon.

Wherein, the materials of the frame and the perforated constraint are respectively selected from aluminum, steel, wood, rubber, plastic, glass, gypsum, cement, high molecular polymer and composite fiber. The material of the membrane is high molecular polymer membrane material, metal membrane or flexible membrane. The high molecular polymer membrane material is preferably polyvinylchloride, polyethylene and polyetherimide. The metal membrane is preferably aluminum and aluminum alloy membrane, titanium and titanium alloy membrane. The flexible membrane is preferably rubber membrane, silica gel membrane or emulsion membrane.

The present invention also provides an acoustic metamaterial plate constructed by the said acoustic metamaterial structural unit.

Wherein, the acoustic metamaterial plate is combined and spliced in the inner plane direction by the said acoustic metamaterial structural unit.

The geometric size and the material parameters of the acoustic metamaterial structural units constructed the acoustic metamaterial plate may be different or same. It is not strictly limited to the same.

The present invention also provides the composite structure constructed by the said acoustic metamaterial plate.

Wherein, the acoustic metamaterial composite structure is stack in the outer vertical direction of the acoustic metamaterial plates.

The geometric size and the material parameters of the acoustic metamaterial plate constructed the acoustic metamaterial composite structure may be different or same. It is not strictly limited to the same.

The acoustic metamaterial composite structure may comprise the routine acoustic material unit or the routine acoustic metamaterial plate.

The routine acoustic metamaterial plate is glass fiber cotton, the porous materials such as open and closed holes of foam, and routine perforated plate, micro-perforated plate, damping material plate and etc.

The space formed by the mulita-layer of acoustic metamaterial plates and the space formed between the acoustic metamaterial plate and the routine acoustic material plate both are filled with the porous materials.

The present invention also provides method for adjusting the operating frequency bands of the acoustic metamaterial structural unit or the acoustic metamaterial composite structure. It is realized by adjusting the sizes and material parameters of the frames, the constraint and the membrane so as to adjust the operating frequency of the acoustic metamaterials.

The present invention also provides an assembly method for putting together the acoustic metamaterial structural units. It is characterized that the perforated constraint and the frames are prepared by the integral forming process. The perforated constraint and the frames are prepared as prefabrications firstly, and then the prefabrication of the perforated constraint is rigidly connected with the frame prefabrication to form the unit frame structure. The membrane is covered the unit frame structure under the freely spreading conditions, and further they are rigidly contacted. Finally, the membrane is perforated. Preferably, the integral forming process is milling, casting, stamping, laser cutting or the 3D printing process. Preferably, the prefabrication of the perforated constraint and frame are prepared by the process of milling, casting, stamping, laser cutting or the 3D printing. Preferably, the rigid connection is gluing connection, hot weld connection or mechanical rivet connection.

Besides, the present invention provides a method for assembling the acoustic metamaterial plate. The assembled acoustic metamaterial structural units are rigidly connected, or the assembled acoustic metamaterial structural units are combined with wedge connector to form the acoustic metamaterial plate with a certain curvature. The perforated constraint and the frames are prepared to be the whole the acoustic metamaterial frame structure by the integral forming process. The membrane is covered the unit frame structure under the freely spreading conditions, and further they are rigidly contacted. Finally, the membrane is perforated. In this case, the sizes and the thickness of the membrane for every acoustic metamaterial structural unit are same. Preferably, the unit structure unit or the whole acoustic metamaterial plate is prepared by integral forming process such as milling, casting, stamping, laser cutting or the 3D printing process. Preferably, the prefabrication of the perforated constraint and frame are prepared by the process of milling, casting, stamping, laser cutting or the 3D printing. Preferably, the rigid connection is gluing connection, hot weld connection or mechanical rivet connection.

The present invention also provides a method for assembling the acoustic metamaterial composite structure. The porous material is made into small units, and further filled into the space formed by the frame and the constraint of the acoustic metamaterial structural unit. In the meanwhile, a whole piece of routine acoustic material plate is perforated in advance, or the whole piece of routine acoustic metamaterial plate is coordinately perforated with the said acoustic metamaterial plate. And then, they are contacted with each other and rigidly connected. Preferably, the porous material is made into small units by the constructing model, clipping or stamping. Preferably, the routine acoustic material plate directly contacts the acoustic metamaterial plate, they are contacted by supporting with the elastic cushion, so as to isolate the vibration delivery between the different acoustic material plates. Preferably, the rigid connection is gluing connection, hot weld connection or mechanical rivet connection.

Further, the present invention provides following specific technical solutions.

An acoustic metamaterial structural unit comprises a frame, a perforated constraint placed in the frame and a piece of membrane covering at least one surface of the frame. Wherein, the perforated constraint is rigidly connected to the frame. The flexible membrane with hole(s) covers the surfaces of frame and is constrained by the constraint. Wherein, at least one perforated constraint is placed inside of the frame. Wherein, both the top and bottom surfaces of frame are covered by the perforated membrane. Preferably, the thickness and material of the perforated membrane covered on the top and bottom surfaces of frame is different. Wherein, porous materials can be filled in the space formed by the two layers of membranes with holes. Preferably, the porous materials are glass fiber, open and closed holes of foam. Wherein, the shape of the frame can realize the maximum area ratio of the structural unit for periodic extending. Preferably, the shape is regular, square or hexagons. Wherein, the perforated constraint is flush with at least one surface of the frame. Wherein, the perforated constraint contacts the flexible membrane by the linear contact or surface contact. Preferably, the shape formed by the contacting is regular symmetric geometry. Preferably, the geometric shape is spherical, square or hexagons. Wherein, the shape of the holes on the constraint is regular symmetric geometry. Preferably, the geometric shape is round Wherein, the size of the hole is determined by both the flow rate passing through the hole and the soundproof operating frequency bond. Wherein, the materials of the frame and the perforated constraint are respectively selected from aluminum, steel, wood, rubber, plastic, glass, gypsum, cement, high molecular polymer and composite fiber. The material of the perforated membrane is high molecular polymer membrane material such as polyvinylchloride, polyethylene and polyetherimide, or metal membrane such as aluminum and aluminum alloy membrane, titanium and titanium alloy membrane, or the flexible membrane such as rubber membrane, silica gel membrane or emulsion membrane. The shape and size of the holes on the membrane are not limited with holes on the constraint. Preferably, the shape and the size of the holes are same.

In particular, the present invention also provides an acoustic metamaterial plate is combined and spliced in the inner plane direction by the said acoustic metamaterial structural unit. The geometric size and the material parameters of the acoustic metamaterial structural units is not strictly limited to the same. The present invention also provides the composite structure constructed by the said acoustic metamaterial plate and the routine acoustic material plate. The routine acoustic material plate is the porous materials such as glass fiber and open and closed holes of foam, and routine perforated plate, micro-perforated plate, damping material plate and etc. The present invention also provides the acoustic metamaterial composite structure is stack in the outer vertical direction of the multi-layers acoustic metamaterial plates. The geometric size and the material parameters of the acoustic metamaterial plate constructed the acoustic metamaterial composite structure are not strictly limited to the same. The space formed by the mulita-layer of acoustic metamaterial plates are filled with the porous materials. The near sound waves produced by the neighboring layers of the acoustic metamaterial plates is reflected back and forth to increase the sound energy density, and further the sound absorption frequency of the porous materials is creased. As a result, the soundproof function of the whole composite plate is increased. The present invention also provides the method for adjusting the operating frequency bands of the acoustic metamaterial structural unit or the acoustic metamaterial composite structure. It is characterized that the operating frequency is adjusted by the sizes and material parameters of the frames, the constraint, the hole on the constraint, flexible membrane, the hole on the flexible membrane of the acoustic metamaterial structural unit. The present invention also provides method for assembling the acoustic metamaterial plate. It is characterized that the acoustic metamaterial structural unit is connected rigidly or flexibly. They can also be combined by the wedge connector to form the acoustic metamaterial plate with a certain curvature.

Comparing the disclosure of the prior art, the beneficial effect of the present invention is stated as follows.

1) The size of the hole on the acoustic metamaterial structural unit can be determined by the passing flow rate and the main frequency bond for soundproof, which can ensure the enough quantity of heat flow, gas flow or liquid flow pass smoothly, and also realize the function of good soundproof performance in broad operating frequency which is main frequency bond of the electro-mechanical noise such as hundreds of Hz.

2) It is no need to place the mass block/the weight into the acoustic metamaterial structural unit. So the defect that the mass block/the weight accidently drops and even jeopardizes the operation of the inner equipment can be avoided. The working stability of the acoustic material is strengthened and the serving time is prolonged. Due to the simplification of the assemble method, the cost is further reduced and the marketing competition ability is stronger.

3) The present acoustic metamaterial structural unit is different from the simple membrane-type acoustic metamaterial without the mass block/weight (US patent application NO: US20140339014A1). The flexural rigidity of the flexible membrane is adjusted by the constraint rigidly connected with the frame, which results the vibration frequency of the whole unit is changed. In other words, the use of the constraint can selectively inhibit or create the specific vibration mode of the flexible membrane, which may increase the degree-of-freedom in the vertical direction of the unit surface.

4) The present invention also provides an acoustic metamaterial structural unit. On the one hand, the diffuse efficiency of the heat energy of the mediums on both sides of the hole is increased by the vibration of the self-structure under the excitation of the soundwave. On the other hand, when the flow is passing, the vibration of the units may prevent the formation of the heat boundary layer and the speed boundary layer, and can further increase the turbulence intensity of the fluid on the wall of the heat resource and accelerate the efficiency of heat exchange.

5) The present acoustic metamaterial structural unit can work independently. The function is determined by the structure of the basic unit or the general units. The acoustic metamaterial structural unit can be assembled with acoustic metamaterial plate in different shapes by the combination and splices of modules. The frames and the perforated constraint can be produced by the batch process such as the molding process, stamping process, or the chemical corrosion process. The difficulty for the process is small.

6) During the assembling the acoustic metamaterial structural unit, the membrane is covered the unit frame structure under the freely spreading conditions, which avoid that the membrane releases the pretension stored during the membrane is assembling under it bears pretension, and finally results the drift of the operating frequency after the long operating time and the changes of the working conditions.

7) The acoustic metamaterial plates can be stacked in the outer vertical direction to form the acoustic metamaterial composite plate. It can widen the effective frequency bond of the whole acoustic metamaterial composite plate. Finally, the excellent soundproof effect for the wide frequency bond is realized only by the minimum cost of area density and the space.

8) The size and distribution of the hole on the acoustic metamaterial plate and the composite plate comprising thereof can be designed according to the flow rate of the fluid passing through the hole and the distribution of the noise frequency bonds produced by the noise source. So it is excellent in customizability.

9) Because each acoustic metamaterial structural unit that is constructed the acoustic metamaterial plate and the composite plate comprising thereof does not need to install the mass-block/the weight, and the frame is connected with the constraint by the rigid connection rod, which strengthen the supporting strength of the whole plate. The acoustic metamaterial plate and the composite plate comprising thereof may be directly used for manufacturing the outer shell structures, without attaching to the surface of the wall.

10) The hole is placed on the membrane and the constraint of the acoustic metamaterial unit. High soundproof quantity is realized by the cancellation between the soundwave passing through the hole and the rebound soundwave in low frequency bond. The effective operating frequency band of the composite structure is significantly widened by the inner combination and splices, the outer vertical stack of the acoustic metamaterial or the combination with the routine acoustic material plates. In the meanwhile, the fluid can pass through the hole smoothly, and vibration is sufficiently used for obtain the good diffuse efficiency of the heat energy and the good efficiency of heat exchange, wherein, the said vibration is produced by the membrane under the excitation of the soundwave and/or the fluid field. Finally, the effect of the soundproof, heat-dissipating and flow-passing is realized in the board frequency bond. That is to say, the inventors creatively use the technical means that the hole is placed on the membrane and the constraint of the acoustic metamaterial unit, and the technical problem that the soundproof, heat-dissipating and flow-passing is hard to realize in the board frequency bond is ingeniously solved. It is the technical problem that a person skilled in the art is always willing to solve, but it has not been solved until now.

Figure 1:
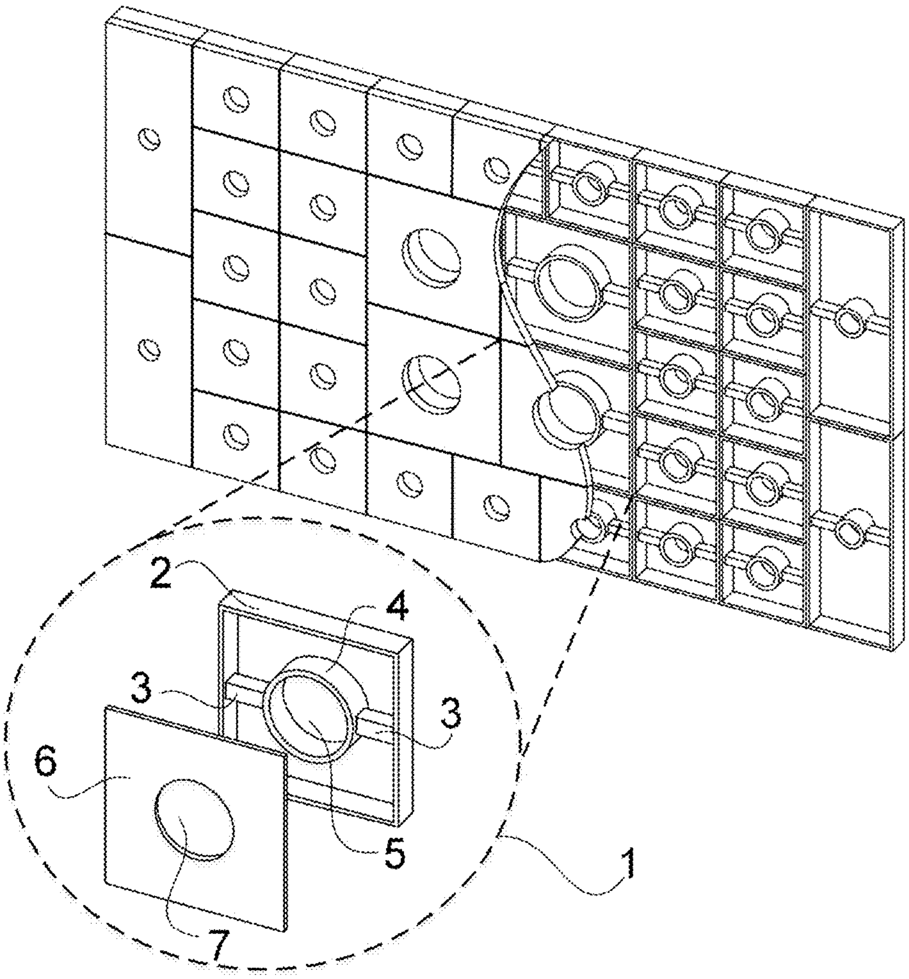
FIG. 1 is a schematic drawing of the present acoustic metamaterial structural unit and the acoustic metamaterial composite plate constructed thereof in inner surface direction.

Wherein, 1—acoustic metamaterial structural unit, 2—frame, 3—the perforated constraint, 4—the hole perforated on the constraint, 5—connection rod, 6—the perforated flexible membrane, 7—the hole perforated on the membrane, 8—the frame of the basic type of the acoustic metamaterial plate in Example 1, 9—the whole piece of the perforated flexible membrane in Example 1, 10—the hole perforated on the membrane in Example 1, 11—the perforated constraint in Example 1, 12—the hole perforated on the constraint in Example 1, 13—double-arm connection rod in Example 1, 14—the acoustic metamaterial structural unit in Example 1, 15—the basic type of the acoustic metamaterial plate in Example 1, 16—heat resource room, 17—heat delivery room, 18—heat resource, 19—the air inflow direction, 20—the routine perforated plate unit with the same area density and the same size of holes, 21—the routine microperforated plate unit with the same area density and the same perforation rate, 22—the incident acoustic chamber, 23—the transmission acoustic chamber, 24—acoustic source of the acoustic impedance tube, 25—the incident acoustic tube of the acoustic impedance tube, 26—the transmission acoustic tube of the acoustic impedance tube, 27—the absorption sound wedge on the end of the acoustic impedance tube, 28—terminals for fixing the microphone, 29—microphone, 30—the tested sample, 31—the incident soundwave, 32—the frame of the light and thin types of the acoustic metamaterial plate in Example 2, 33—the whole piece of the perforated flexible membrane in Example 2, 34—the hole perforated on the membrane in Example 2, 35—the perforated constraint in Example 2, 36—the hole perforated on the constraint in Example 2, 37—connection rod with double arms in Example 2, 38—the acoustic metamaterial structural unit in Example 2, 39—the acoustic metamaterial plate in Example 2, 39—frame of the acoustic metamaterial plate comprising units in different parameters in Example 3, 40—the whole piece of the perforated flexible membrane in Example 3, 41—the hole perforated on the membrane in Example 3, 42—the perforated constraint in Example 3, 43—the hole perforated on the constraint in Example 3, 44—connection rod with double arms in Example 3, 45—the acoustic metamaterial structural unit in Example 3, 46—frame of the acoustic metamaterial plate with large size of hole in Example 4, 47—the large size of the hole on the constraint in Example 4, 48—the constraint with the small size of hole in Example 4, 49—the small size of the hole on the constraint in Example 4, 50—connection rod with double arms in Example 4, 51—the acoustic metamaterial structural unit in Example 3, 51-the basic acoustic metamaterial structural unit in Example 4, 52—the whole piece of the perforated flexible membrane in Example 4, 53—the small size of hole on the membrane in Example 4, 54—the large size of hole on the membrane in Example 4, 55—the frame of the general acoustic metamaterial structural unit in Example 4, 56—the perforated constraint of the general acoustic metamaterial structural unit in Example 4, 57—the connection rod of the general acoustic metamaterial structural unit in Example 4, 58—the general acoustic metamaterial structural unit in Example 4, 59—the frame of the general acoustic metamaterial structural unit deriving from Example 4, 60—the perforated constraint of the general acoustic metamaterial structural unit deriving from Example 4, 61—the holes perforated on the constraint of the general acoustic metamaterial structural unit deriving from Example, 62—the first type of the connection rod of the general acoustic metamaterial structural unit deriving from Example 4, 63—the perforated flexible membrane of the general acoustic metamaterial structural unit deriving from Example 4, 64—the holes on the membrane of the general acoustic metamaterial structural unit deriving from Example 4, 65—the second type of the connection rod of the general acoustic metamaterial structural unit deriving from Example 4, 66—round frame in Example 5, 67—the hole perforated on the constraint in Example 5, 68—the constraint in Example 5, 69—the connection rod with double arms in Example 5, 70—the regular hexagon frame in Example 5, 71—the connection rod with a single arm in Example 5, 72—the rectangle frame in Example 5, 73—the frame of the acoustic metamaterial structural unit covered the membrane on both surfaces in Example 6, 74—the first layer of the perforated flexible membrane in Example 6, 75—the second layer of the perforated flexible membrane in Example 6, 76—the hole of the first layer of the perforated flexible membrane in Example 6, 77—the hole of the second layer of the perforated flexible membrane in Example 6, 78—the perforated constraint in Example 6, 79—the connection rod with double arms in Example 6, 80—the space of the chambers, 81—the hole on the constraint in Example 6, 82—the porous material in Example 6, 83—the hole on the porous material in Example 6, 84—the frame of the acoustic metamaterial structural unit with the function of heat transferring enforcement in Example 7, 85—the first layer of the perforated flexible membrane in Example 7, 86—the second layer of the perforated flexible membrane in Example 7, 87—the hole of the second layer of the perforated flexible membrane in Example 7, 88—the additional round hole on the second layer of the perforated flexible membrane in Example 7, 89—the hole on the first layer of the perforated flexible membrane in Example 7, 90—the perforated constraint in Example 7, 91—the hole on the constraint in Example 7, 92—the connection rod with double arms in Example 7, 93—the additional holes with different sizes and shapes on the second layer of the perforated flexible membrane in Example 7, 94—the elastic diaphragm in Example 7, 95—the framework of the acoustic metamaterial plate in Example 8, 96—the whole piece of the perforated membrane of the acoustic metamaterial plate in Example 8, 97—the routine acoustic material in Example 8, 98—the framework of the first layer of the acoustic metamaterial plates in Example 9, 99—the whole piece of the perforated membrane of the first layer of the acoustic metamaterial plate in Example 9, 100—the framework of the second layer of the acoustic metamaterial plates in Example 9, 101—the whole piece of the perforated membrane of the second layer of the acoustic metamaterial plate in Example, 102—the air gap between the two layers of the routine acoustic material plates, 103—the porous material in Example 9, 104—the acoustic metamaterial structural unit with the curved surface in Example 10, 105—the wedge connector in Example 10.

EMBODIMENTS

In order to sufficiently describe the technical solutions for solving the present technical problem, the description are detailed as follows, combining the examples and the drawings. But, the technical solutions, the embodiment and the protection scope is not limited as shown herein.

"acoustic metamaterial" described herein is general defined as following: it is an artifact designed microstructure, and possesses the acoustic properties that the national and routine material can not realize, the acoustic properties comprises the characteristic "negative mass" and "negative volume module" that are necessary for controlling the low-frequency soundwave. In the present field, the acoustic metamaterial is a type of the structure and the constructed material self is routine material. The said "acoustic metamaterial" is commonly known for a person skilled in the art.

The present invention provides an acoustic metamaterial structural unit with the functions of soundproof, gas permeability and heat-transferring enhancement. The acoustic metamaterial structural unit comprises the frame, at least one perforated constraint and the flexible perforated membrane covering at least one side. More than one acoustic metamaterial structural units are constructed by the inner combination and splices to form acoustic metamaterial plate. Preferably, the parameters of sizes and materials of the constructed acoustic metamaterial structural units are different. The acoustic metamaterial plate can be composited with the routine material plate to form the material composite structure. More than one layers of the acoustic metamaterial plates can be constructed to form acoustic metamaterial composite plate by the outer vertical stack. Preferably, the parameters of sizes and materials of the multi-layers acoustic metamaterial plates are different.

The frame is connected with the perforated constraint by the rigid connection rod. The shapes and numbers of the rigid connection rods are not limited. The perforated membrane is covered on the frame and is constrained by the profile of the constraint. Preferably, the perforated constraint is flush with at least one surface of the frame.

The shape of the frame is not limited. The shape such as regular, square or hexagons are preferable, and they can realize the maximum area ratio of the structural unit for periodic extending.

The perforated constraint contacts the perforated flexible membrane by the linear contact or surface contact. Preferably, the shape formed by the contacting is regular symmetric geometry. More preferably, the geometric shape is spherical, square or hexagons.

The quantities of the perforated constraints is not limited. At least one perforated constraint is placed, and the perforated constraint is generally placed the in the frame and near the maximum area of the amplitude produced by the resonant vibration of the structure unit without placing the perforated constraint. For example, when the first type of the resonant vibration is produced by the structure unit that the geometric shape of the frame is symmetric and the constraint is not placed, the amplitude of the central area is maximum. The present technical solutions that the constraint rigidly connected with the frame are used for adjusting the flexural rigidity of the flexible membrane can be used for changing the vibration frequency of the whole unit. In other words, the introduction of the constraint can selectively inhibited or created the specific vibration mode of the flexible membrane, which may increase the degree-of-freedom in the outer direction of the acoustic metamaterial structural unit surface. The shape of the holes on the constraint is regular symmetric geometry. Preferably, the geometric shape is spherical, and it considers on the basis of the process on one side, and also considers the speed of the fluid on the other side. The size of the hole is determined by both the flow rate passing through the hole and the soundproof operating frequency bond. For example, when it is used in the occasions that the requirement of flow-passing efficiency is high, the hole should be big enough so as to reduce the loss of the flow rate and the influence of the pressure reduction. In the occasions that the soundproof operating frequency bond approaches the low frequency, under the precondition that the geometric size and the material parameters of the membrane is not changed, the hole in small size may make the soundproof operating frequency bond approach the low frequency.

The materials of the frame and the perforated constraint are respectively selected from aluminum, steel, wood, rubber, plastic, glass, gypsum, cement, high molecular polymer and composite fiber, which can satisfy the supporting strength of the structure self and the requirement of the structural rigidity in the operating frequency bond.

The material of the perforated flexible membrane can be any soft material, for example the elastic material with the similar properties of rubber, the high molecular polymer membrane material with the similar properties of polyvinylchloride, polyethylene and polyetherimide.

When the perforated flexible membrane is connected with the frame and the perforated constraint, the pretension are not exerted and the flexible membrane is assembled under the freely spreading conditions. The holes on the flexible membrane can be preprocessed or can be perforated after covering the flexible membrane.

The operating frequency of the acoustic metamaterial structural unit can be accurately designed by adjusting the structural sizes or the material parameters of the frame, constraint, the holes on the constraint, the flexible membrane and the hole on the perforated membrane, which results that the flow rate of the fluid and the operating frequency for soundproof can be ordered before production. For example, when the acoustic metamaterial structural unit is needed to work on the low frequency, small holes on the constraint and the membrane, large size of frame, short diameter of constraint, the thinner flexible membrane or the flexible membrane with less curved YANG's capacity can be chosen. On the contrary, when the acoustic metamaterial structural unit is needed to work on the high frequency, big holes on the constraint and the membrane, small size of frame, long diameter of constraint, the thicker flexible membrane or the flexible membrane with larger curved Young modulus can be chosen. In order to fully used the space for the structure unit and to increase the effect for reducing the noise, as for the acoustic metamaterial structural unit that the thickness of the frame is larger, the two sides surface of the frame both can be covered with the perforated membrane. Both the thickness and the material parameters of the two layers of membrane can be different, and the two different main operating frequency can be realized in the meanwhile. Besides, the porous materials such as glass fiber, open and closed holes of foam can be filled in the space which is naturally formed by the two layers of the membranes, so that the properties of sound absorption and energy consumption of the whole structure is further promoted.

The present invention also provides an acoustic metamaterial structural unit. On the one hand, the diffuse efficiency of the heat energy of the mediums on both sides of the hole is increased by the vibration of the self-structure under the excitation of the soundwave. On the other hand, when the flow is passing, the vibration of the units may prevent the formation of the heat boundary layer and the speed boundary layer, and can further increase the turbulence intensity of the fluid on the wall of the heat resource and accelerate the efficiency of heat exchange. Besides, the turbulence intensity of the near fluid field is further increased by covering the other side of the acoustic metamaterial structural unit with the perforated flexible membrane or several layers of the flexible membranes, and the multiple holes on the membrane are in same size and in the shape of round or the size and the shape of the multiple holes on the membrane are different.

The present invention also provides an acoustic metamaterial plate is combined and spliced in the inner plane direction by the said acoustic metamaterial structural unit. The geometric size and the material parameters of the acoustic metamaterial structural units is not strictly limited to the same. The frame of the acoustic metamaterial structural unit is connected rigidly or flexibly. They can also be combined by the wedge connector to form the acoustic metamaterial plate with a certain curvature, which can satisfy the installment requirement on the non-flat and non-vertical surfaces in the practical engineering application.

The said acoustic metamaterial plate and the routine acoustic material plate can be constructed to form the composite structure. Wherein, the routine acoustic material plate is the porous materials (such as glass fiber or open and closed holes of foam open and closed holes of foam), and routine perforated plate, micro-perforated plate, damping material plate and etc. The introduction of routine acoustic material may widen the operating frequency bond of the acoustic metamaterial plate in different extent.

The acoustic metamaterial composite structure is constructed by stacking in the outer vertical direction of the multiple layers acoustic metamaterial plates. The geometric size and the material parameters of the acoustic metamaterial plate constructed the acoustic metamaterial composite structure are not strictly limited to the same. The space formed by the mulita-layer of acoustic metamaterial plates are filled with the porous materials such as glass fiber or open and closed holes of foam open and closed holes of foam. The near sound waves produced by the neighboring layers of the acoustic metamaterial plates is reflected back and forth to increase the sound energy density, and further the sound absorption frequency of the porous materials is creased. Therefore, the sound absorption coefficient of the porous material is not necessary to be big in the low frequency, and the characteristic impedance should match the membrane, which can avoid the soundwave not entering into the porous material effectively. In the meanwhile, the influence of the filled porous material on the flexural vibration rigidity of the membrane should be considered, and the operating frequency of the original designed acoustic metamaterial structural unit should be modified.

The embodiments are used for further describing the present invention in detail by combining the drawings.

FIG. 1 is an embodiment of the present invention, and it is the acoustic metamaterial composite plate constructed with the array acoustic metamaterial structural unit in inner surface direction. The sizes of the acoustic metamaterial structural unit (1) as the basic array element should be different. Each structural unit comprises the frames (2), the perforated constraint (3), the frames connected with the perforated constraint by the double-arm connection rod (5). The perforated flexible membrane (6) covers on the top surface of the acoustic metamaterial structural unit, in which holes perforated on the membrane (7) and holes are the hole perforated on the constraint (4) are placed.

Figure 2:
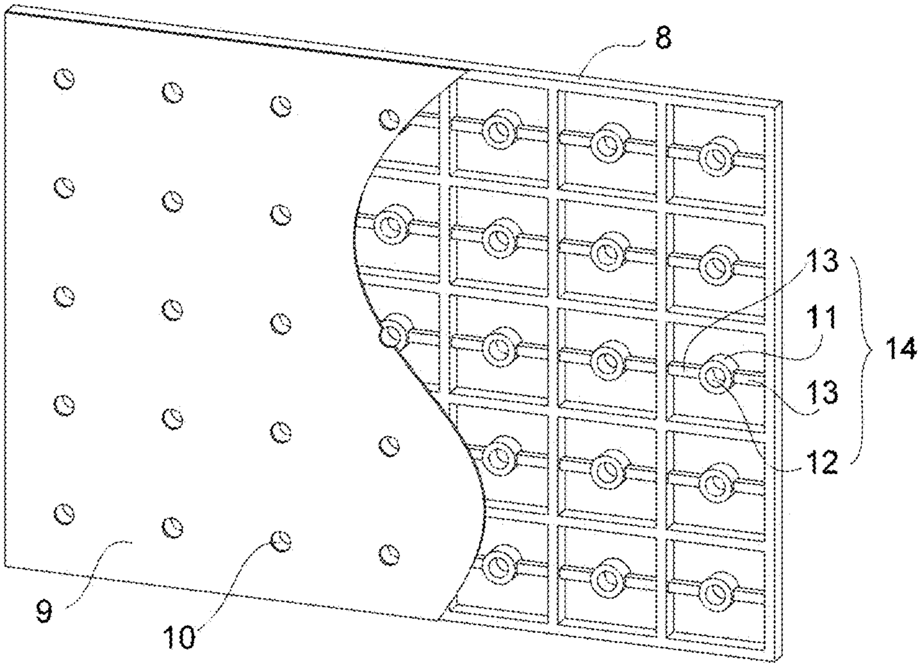
FIG. 2 is a schematic drawing of the basic type of the acoustic metamaterial structural unit and the acoustic metamaterial composite plate constructed thereof in inner surface direction in example 1.

FIG. 2 is a schematic drawing of the basic type of the acoustic metamaterial structural unit and the acoustic metamaterial composite plate constructed thereof in inner surface direction in example 1. Wherein, the geometric sizes of the acoustic metamaterial structural unit (14) as the basic array element is completely same. Each structural unit comprises the perforated constraint (11), the hole perforated on the constraint (12), the frames connected with the perforated constraint by the double-arm connection rod (13). The whole piece of the perforated flexible membrane (9) are covered on the one side of the frame (8) under the freely spreading conditions, and any pretension is not exerted on the membrane. The diameter of the hole perforated on the membrane (10) is same as the hole perforated on the constraint (12). Wherein, the shape of the frame of the acoustic metamaterial (14) is square, which the inner side length is 27 mm and the outer side length is 29 mm, the thickness is 5 mm. The diameter of the outer contour of the perforated constraint (11) is 10 mm. The diameter of the holes perforated on the constraint is 5 mm. The thickness of the perforated flexible membrane (9) is 0.05 mm, the diameter of the holes (10) on which is also 5 mm. The cross-section of the connection rod (13) connected the frame and the constraint is rectangular whose length is 4 mm and the width is 3 mm. The materials of the frame (8), the perforated constraint (11) and the double-arm connection rod (13) is FR-4 glass fiber and they are same. The material of the perforated flexible membrane (9) is polyetherimide.

Figure 3:
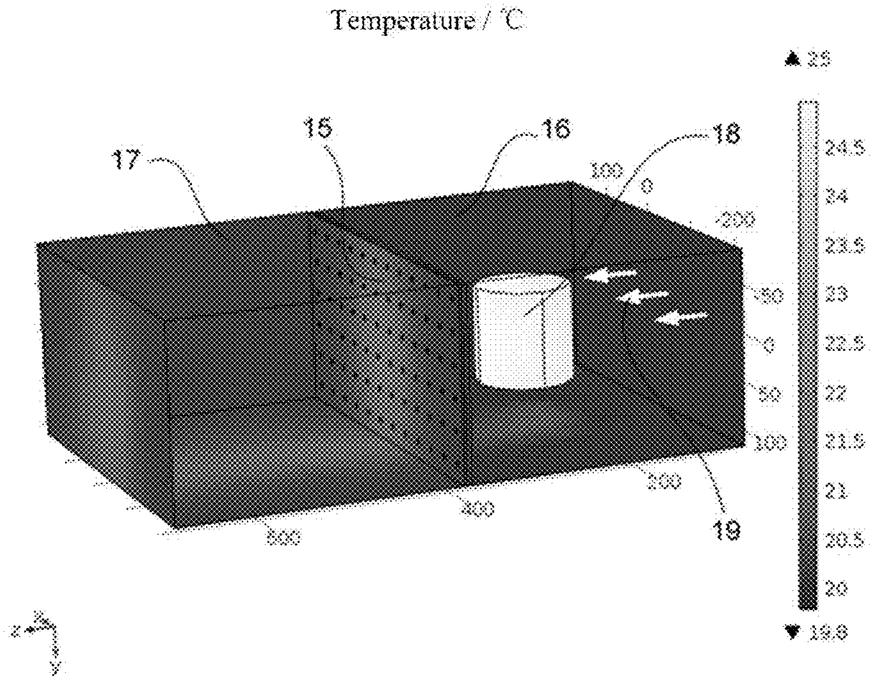
FIG. 3 is the finite element method (FEM) simulation result of the distribution of the stable temperature field of the basic type of the acoustic metamaterial plate under the situation of the convection heat transfer in example 1.

FIG. 3 is the finite element method (FEM) simulation result of the distribution of the stable temperature field of the basic type of the acoustic metamaterial plate (15) under the situation of the convection heat transfer in example 1. Wherein, in the FEM simulation mode, the white cylinder is defined as heat source (18), and the total power is 10 W. The white arrow represents the air inflow direction (19), the initial temperature of the cross-section is designed as 20° C., and the average flow rate of the air is 0.2 m/s. The model further comprises heat resource room (16) and heat delivery room (17). Except the side placed the basic type of the acoustic metamaterial plate of the two rooms, all other sides of the two rooms are designed as insulation wall. From the calculation result of the FEM, it can be seen that the higher temperature of the temperature field is 25° C. and the temperature of most area is near the room temperature (20° C.), which demonstrates that the function of ventilation and heat dissipation of the basic type of the acoustic metamaterial plate is good and the heat energy is not accumulated near the heat source. Therefore, when the basic type of the acoustic metamaterial plate in Example 1 is installed on one side of the insulated and closed chamber, there is no heat dissipation obstacle existing.

Figure 4:
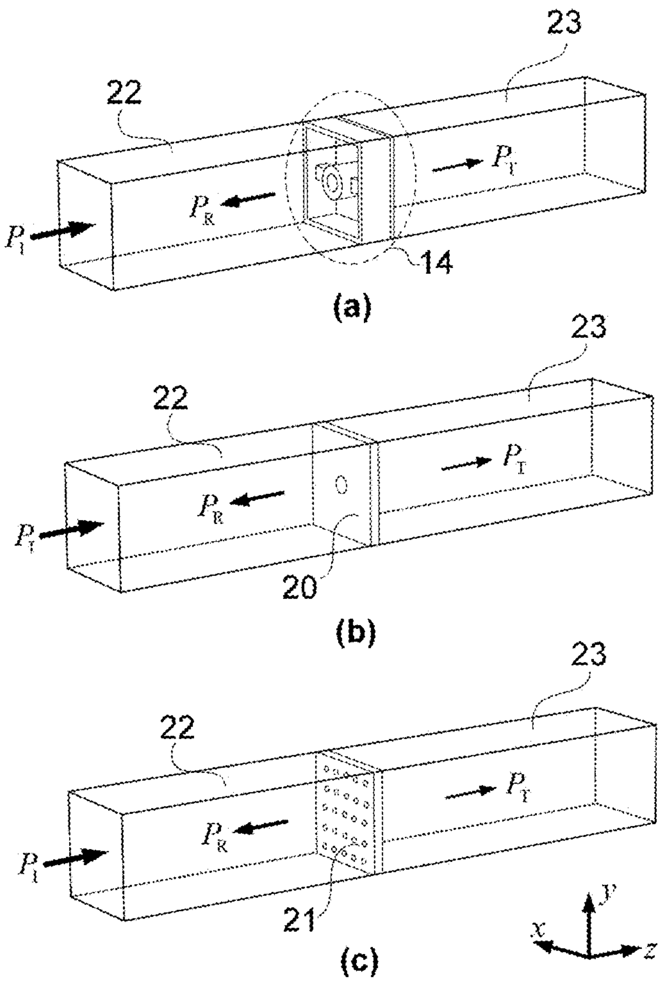
FIG. 4 is a schematic drawing of the finite element method (FEM) simulation calculation models of the Sound Transmission Loss (Sound Transmission Loss, short for STL) in normal direction for the acoustic metamaterial structural unit, the routine perforated plate with the same sizes of holes, and the micro-perforated plate with the same area density and the same perforation rate in Example 1.

FIG. 4 is a schematic drawing of the finite element method (FEM) simulation calculation models of the Sound Transmission Loss (Sound Transmission Loss, short for STL) in normal direction for the acoustic metamaterial structural unit (14), the routine perforated plate (20) with the same sizes of holes, and the micro-perforated plate (21) with the same area density and the same perforation rate. Wherein, in the FEM simulation mode, the front side and the back side of the three structural unit all place the incident acoustic chamber (22) and the transmission acoustic chamber (23). The incident soundwave from the incident acoustic chamber strikes on the structural unit, and the reflection soundwave $P_R$ and the transmitter soundwave $P_T$ are produced. The Sound.Transmission Loss in normal direction is calculated by $STL=20\ \log_{10}|P_I/P_T|$. In the FEM simulation mode, the thickness of the routine perforated plate with the same area density and the same perforation rate is 1.2 mm; the material is 6063 Aluminum alloy and the diameter of the hole is 5 mm. The thickness of the micro-perforated plate (21) with the same area density and the same perforation rate is 1.2 mm; the material is 6063 Aluminum alloy and the diameter of the hole is 1 mm. The area density of the three structural units is 3.56 kg/$m^2$ and the perforation rate of the three structural units is 2.33%.

Figure 5:
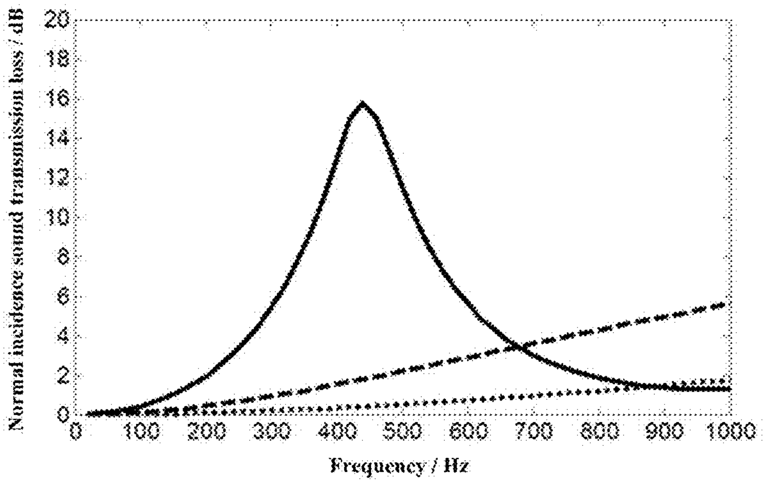
FIG. 5 is a comparative drawing of the finite element method (FEM) simulation results of the Sound Transmission Loss in normal direction for the acoustic metamaterial structural unit, the routine perforated plate with the same sizes of holes, and the micro-perforated plate with the same area density and the same perforation rate.

FIG. 5 is a comparative drawing of the finite element method (FEM) simulation results of the Sound Transmission Loss in normal direction for the acoustic metamaterial structural unit (14), the routine perforated plate unit (20) with the same sizes of holes, and the micro-perforated plate unit (21) with the same area density and the same perforation rate. Wherein, the solid line represents the acoustic metamaterial structural unit (14), the dashed line represents the routine perforated plate unit (20) with the same sizes of holes and the same area density, and the dotted line represents the micro-perforated plate unit (21) with the same area density and the same perforation rate. From the figure, it can see that the Sound Transmission Loss in normal direction of the acoustic metamaterial structural unit (14) is higher than the routine perforated plate unit (20) with the same sizes of holes and the same area density in the frequency bond lower than 680 Hz. The Sound Transmission Loss in normal direction of the acoustic metamaterial structural unit (14) is higher than the micro-perforated plate unit (21) with the same area density and the same perforation rate in the frequency bond lower than 880 Hz. Besides, the curve of the Sound Transmission Loss in normal direction of the acoustic metamaterial structural unit (14) appears a spike in the frequency of 440 Hz, and the STL value reaches 17 dB. The spike STL value is higher than the micro-perforated plate unit (21) with the same area density and the same perforation rate about 14 dB, and higher than the routine perforated plate unit (20) with the same sizes of holes and the same area density about 15.4 dB. Besides, it can be seen that the function of the low-frequency soundproofing for the micro-perforated plate unit (21) with the same area density and the same perforation rate is worst. The reason is that the single micro-perforated plate unit lacks the back panel structure, and the Helmholtz Resonant Absorber cannot be formed and further the effective chamber resonance and friction energy consumption cannot realize.

Figure 6:
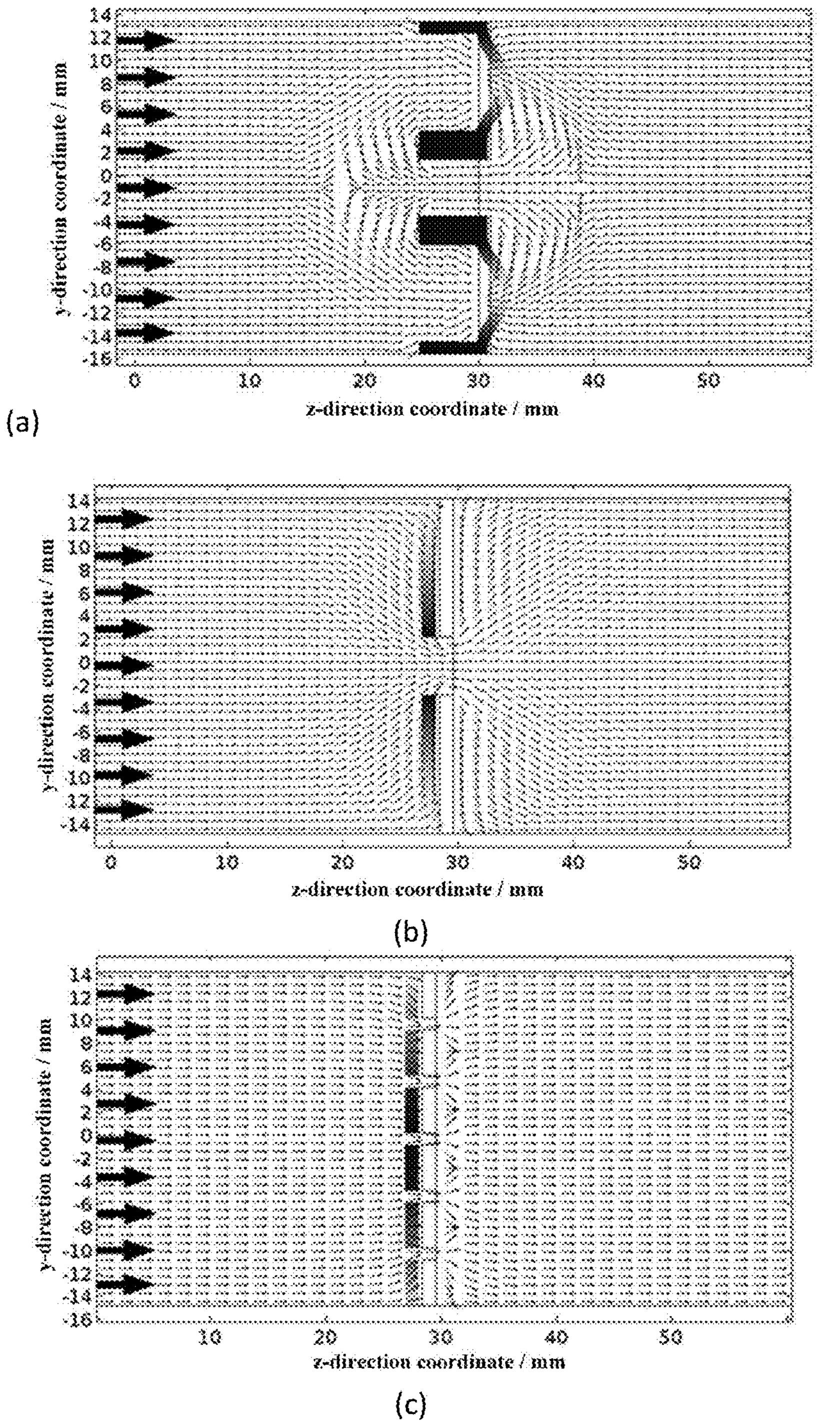
FIG. 6 is the finite element method (FEM) simulation results of speed directions of the air particles in incident acoustic chamber and the transmission acoustic chamber, and the acoustic metamaterial structural unit, the routine perforated plate with the same sizes of holes, and the micro-perforated plate with the same area density and the same perforation rate is excited by the soundwave frequency of 440 Hz.

FIG. 6 is the finite element method (FEM) simulation results of speed directions of the air particles in incident acoustic chamber and the transmission acoustic chamber for the acoustic metamaterial structural unit (14), the routine perforated plate unit (20) with the same sizes of holes and the same area density, and the micro-perforated plate unit (21) with the same area density and the same perforation rate is excited by the soundwave frequency of 440 Hz. Wherein, FIG. 6 (*a*) is the finite element method (FEM) simulation result of the acoustic metamaterial structural unit (14); FIG. 6 (*b*) is the finite element method (FEM) simulation result of the routine perforated plate unit (20) with the same sizes of holes and the same area density, and FIG. 6 (*b*) is the finite element method (FEM) simulation result of the micro-perforated plate unit (21) with the same area density and the same perforation rate.

Figure 7:
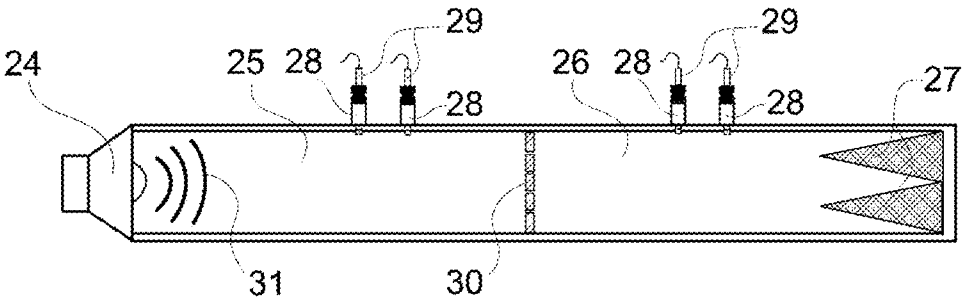
FIG. 7 is a schematic drawing of acoustic impedance tube test system for testing the incident Sound Transmission Loss of the acoustic material sample in normal direction by the four-sensor method according to the standard of ASTM E2611-09.

FIG. 7 is a schematic drawing of acoustic impedance tube test system for testing the incident Sound Transmission Loss of the acoustic material sample in normal direction by the four-sensor method according to the standard of ASTM E2611-09 (Standard test method for measurement of normal incidence sound transmission of acoustical materials based on the transfer matrix method). Wherein, the acoustic impedance tube comprises the incident acoustic tube of the acoustic impedance tube (25) and the transmission acoustic tube of the acoustic impedance tube (26); the acoustic source (24) placed on the acoustic impedance tube (25). The white noise excitation incident soundwave (31) in broad frequency produced by the acoustic source is developed to be the plane sound wave before it reaches the tested sample, which the wave-front amplitude tends to uniform. The absorption sound wedge (27) placed on the end of the transmitting acoustic impedance tube (26) can reduce the influence of the several times of reflection of the sound for the test result. Besides, four terminals for fixing the microphone (28) are placed on the two sides of the testing sample. The microphones (29) (Mode: 4187, Brüel & Kjær) are inserted into the terminals for fixing the microphones, each two of which respectively are used for the incident acoustic tube of the acoustic impedance tube (25) and the transmission acoustic tube of the acoustic impedance tube (26). The effective tested frequency bond is 70 Hz~890 Hz for the testing system, which covers third octave frequency bond of the central frequency of 80 Hz~800 Hz. The central line of the soundproof curve can also reflect the soundproof level of the sample factually in other frequency except the said frequency bond.

Figure 8:
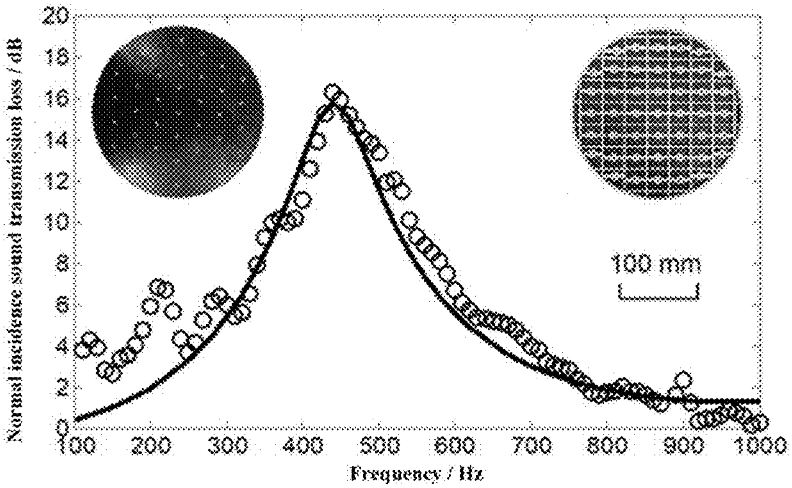
FIG. 8 is a comparative drawing of the finite element method (FEM) simulation results and testing result of the incident Sound Transmission Loss in normal direction for the samples of acoustic metamaterial structural unit, the routine perforated plate with the same area density and the same sizes of holes, and the micro-perforated plate with the same area density and the same perforation rate in Example 1.
Figure 8:
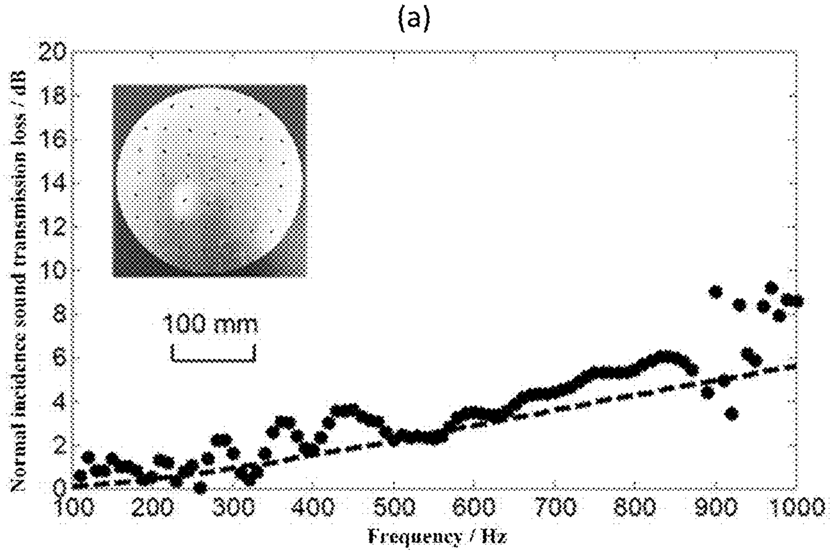
Figure 8:
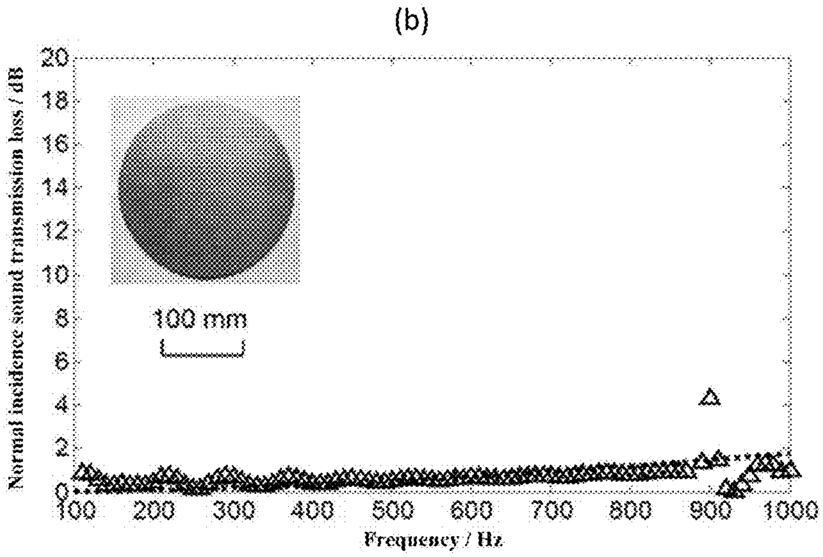

FIG. 8 is a comparative drawing of the finite element method (FEM) simulation results and testing result of the incident Sound Transmission Loss in normal direction for the samples of acoustic metamaterial structural unit, the routine perforated plate with the same area density and the same sizes of holes, and the micro-perforated plate with the same area density and the same perforation rate in Example 1. Wherein, FIG. 8 (*a*) is the finite element method (FEM) simulation result of the acoustic metamaterial structural unit (14) in Example 1; FIG. 8 (*b*) is the finite element method (FEM) simulation result of the routine perforated plate unit (20) with the same area density and the same sizes of holes, and FIG. 8 (*c*) is the finite element method (FEM) simulation result of the micro-perforated plate unit (21) with the same area density and the same perforation rate.

Figure 9:
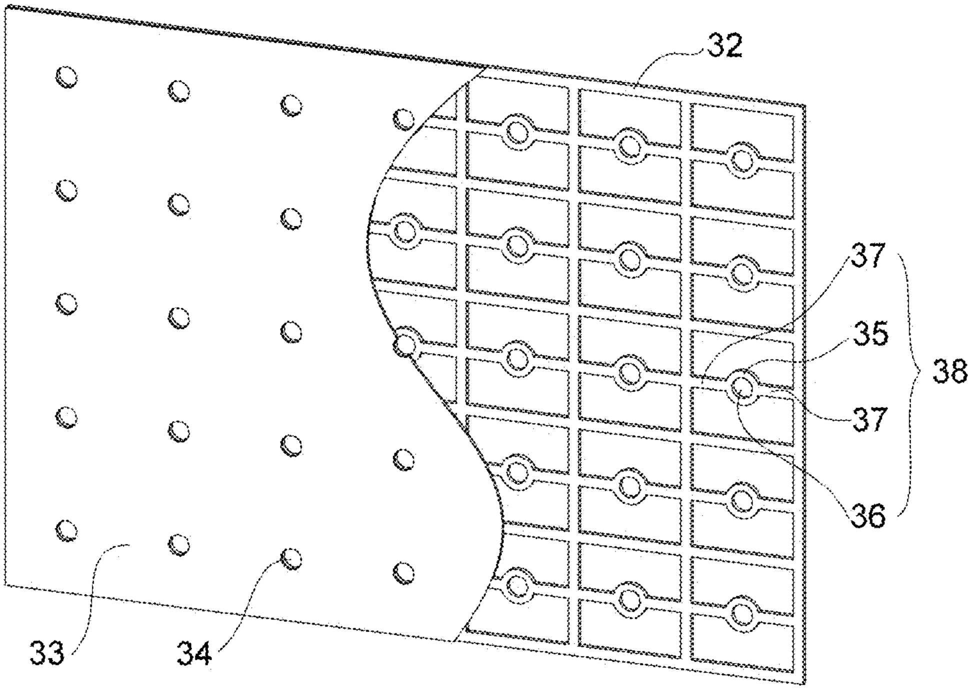
FIG. 9 is a schematic drawing of the acoustic metamaterial structural unit and the thin and light acoustic metamaterial plate constructed thereof in inner surface direction in Example 2.

FIG. 9 is a schematic drawing of the acoustic metamaterial structural unit and the thin and light acoustic metamaterial plate constructed thereof in inner surface direction in Example 2. Wherein, the structure size of the acoustic metamaterial structural units (38) as the basic array element is same. The most difference between the present sample and the sample in Example 1 in structural types is stated as follows. The connection rod (37) connected the perforated constraint (35) and the frame (32) of the acoustic metamaterial structural units (38) is flush with the frame, so it avoids the design of the subsidence surface, which simplifies the process complexity. Further, the thickness of the whole acoustic metamaterial plate can be thinner.

In Example 2, the shape of the frame of the acoustic metamaterial unit (38) is square; the inner side length is 35 mm; the width of the frame (32) is 3 mm; the thickness of the frame (32) is 1.5 mm. The diameter of the outer contour of the perforated constraint (35) is 12 mm. The diameter of the holes perforated on the constraint (36) is 7 mm. The whole piece of the perforated flexible membrane (9) that the thickness is 0.05 mm is covered on the one side of the frame (32) under the freely spreading conditions and any pretension is not exerted on the membrane. The diameter of the hole perforated on the membrane (34) is same as the hole perforated on the constraint (36), i.e., 7 mm. The cross-section of the connection rod (37) connected the frame (32) and the perforated constraint (35) is rectangular whose length is 3 mm and the width is 1.5 mm. The materials of the frame (32), the perforated constraint (35) and the double-arm connection rod (37) is common carbon steel with the grade of Q235A, and they are same. The material of the perforated flexible membrane is polyetherimide. The area density of the thin and light acoustic metamaterial plate is 4.20 kg/m$^2$ and the perforation rate is 3.48%.

Figure 10:
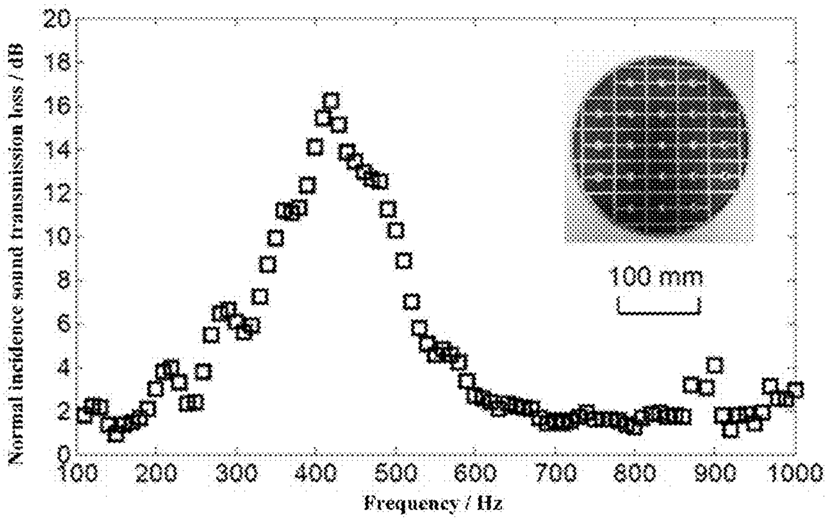
FIG. 10 is the testing result of the incident Sound Transmission Loss in normal direction for the light and thin acoustic metamaterial plate in Example 2.

FIG. 10 is the testing result of the incident Sound Transmission Loss in normal direction for the light and thin acoustic metamaterial plate in Example 2. The sample photo is on the right of the Figure, and the outer diameter is 225 mm.

Figure 11:
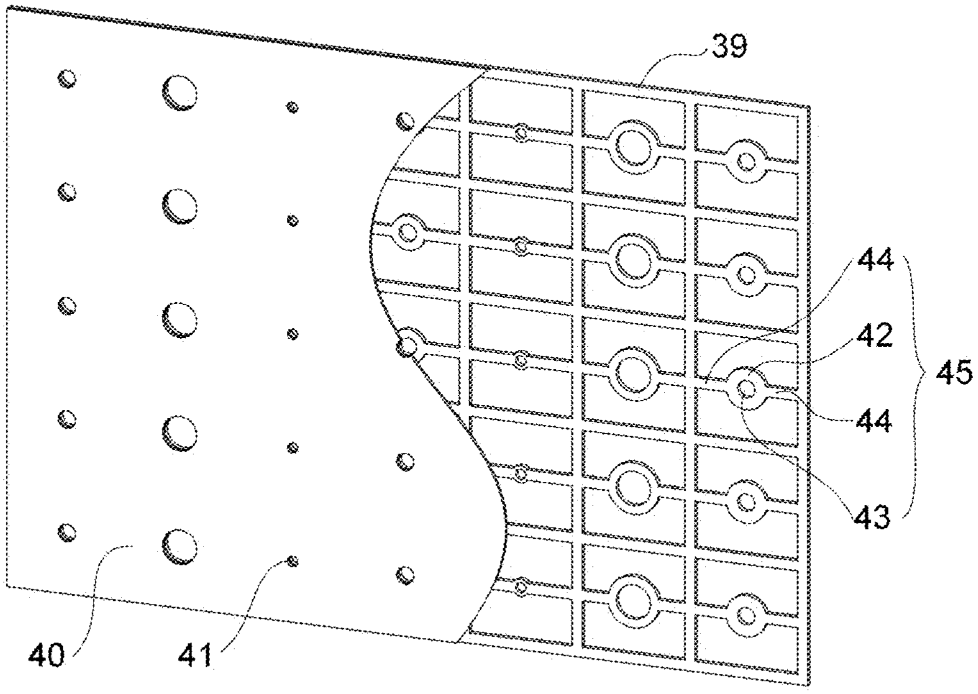
FIG. 11 is a schematic drawing of the acoustic metamaterial structural unit and the acoustic metamaterial plate constructed the units with different parameters in inner surface direction in Example 3.

FIG. 11 is a schematic drawing of the acoustic metamaterial structural unit and the acoustic metamaterial plate constructed the units with different parameters in inner surface direction in Example 3. Wherein, the structure sizes of the acoustic metamaterial structural units as the basic array element are different. The diameter of the inner constraint is different from the diameter of the holes perforated on the constraint. Take a certain acoustic metamaterial structural unit (45) as an example, the connection rod (44) connected the perforated constraint (42) and the frame (39) of the acoustic metamaterial structural units (45) is flush with the frame (39). The structure is similar with the acoustic metamaterial structural unit (38) in Example 2.

Figure 12:
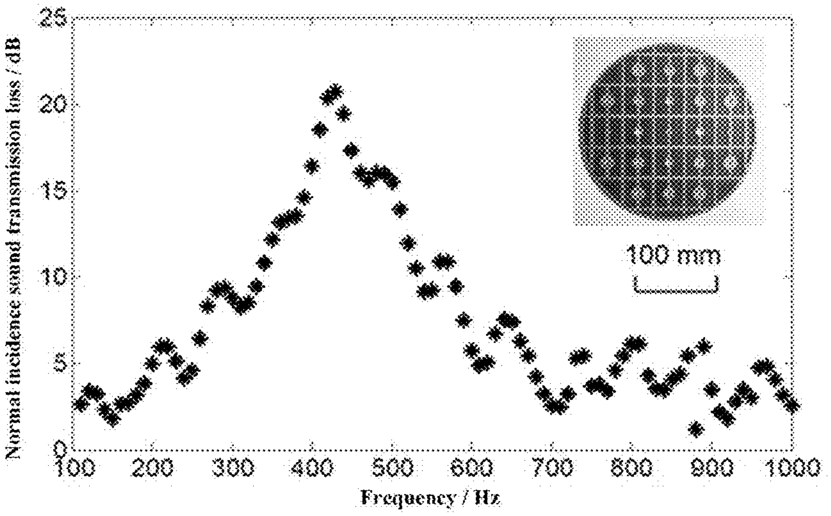
FIG. 12 is the testing result of the incident Sound Transmission Loss in normal direction for the samples acoustic metamaterial plate constructed the units with different parameters in Example 3.

FIG. 12 is the testing result of the incident Sound Transmission Loss in normal direction for the samples acoustic metamaterial plate constructed the units with different parameters in Example 3. The sample photo is on the right of the Figure, and the outer diameter is 225 mm.

Figure 13:
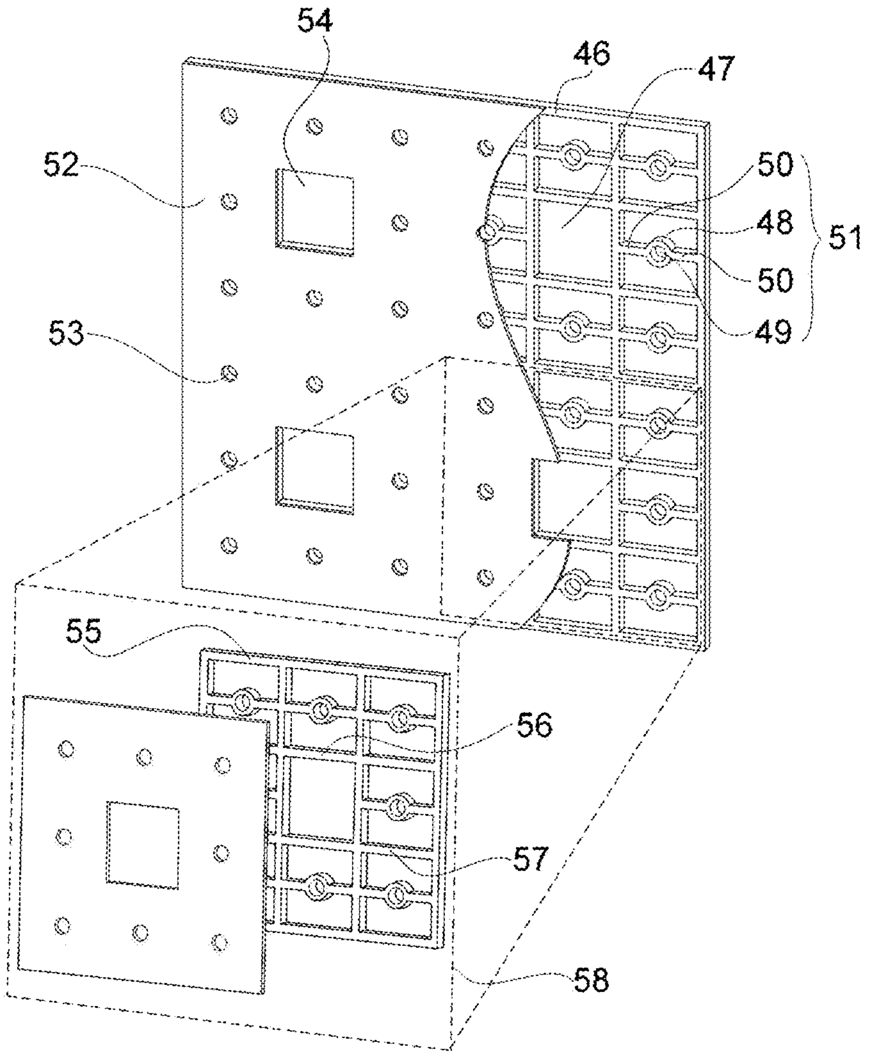
FIG. 13 is a schematic drawing of the acoustic metamaterial structural unit and the acoustic metamaterial plate constructed the units in inner surface direction in Example 4, and the large size of holes are placed on the acoustic metamaterial plate.

FIG. 13 is a schematic drawing of the acoustic metamaterial structural unit and the acoustic metamaterial plate constructed the units in inner surface direction in Example 4, and the large size of holes are placed on the acoustic metamaterial structural unit.

Figure 14:
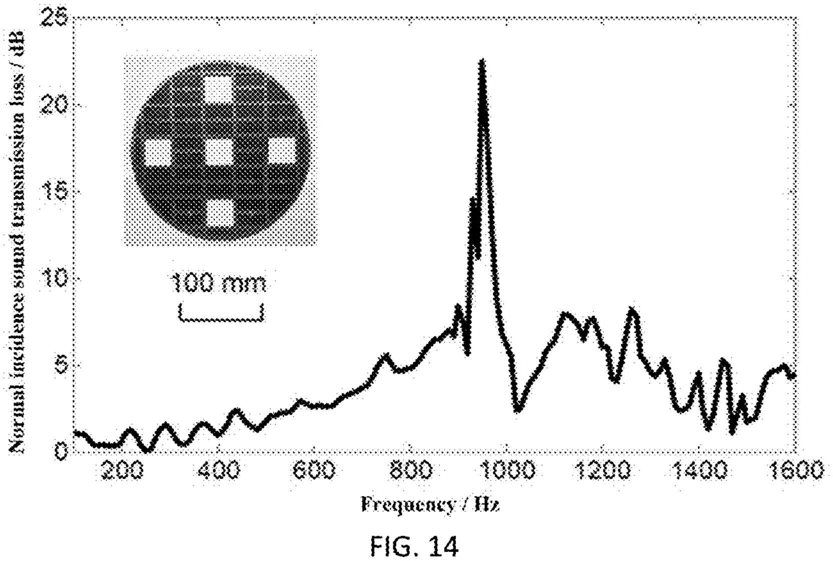
FIG. 14 is the testing result of the incident Sound Transmission Loss in normal direction for the samples acoustic metamaterial plate constructed the units with the large size of holes in Example 4.

FIG. 14 is the testing result of the incident Sound Transmission Loss in normal direction for the samples acoustic metamaterial plate constructed the units with the large size of holes in Example 4. The sample photo is on the left of the Figure, and the outer diameter is 225 mm.

Figure 15:
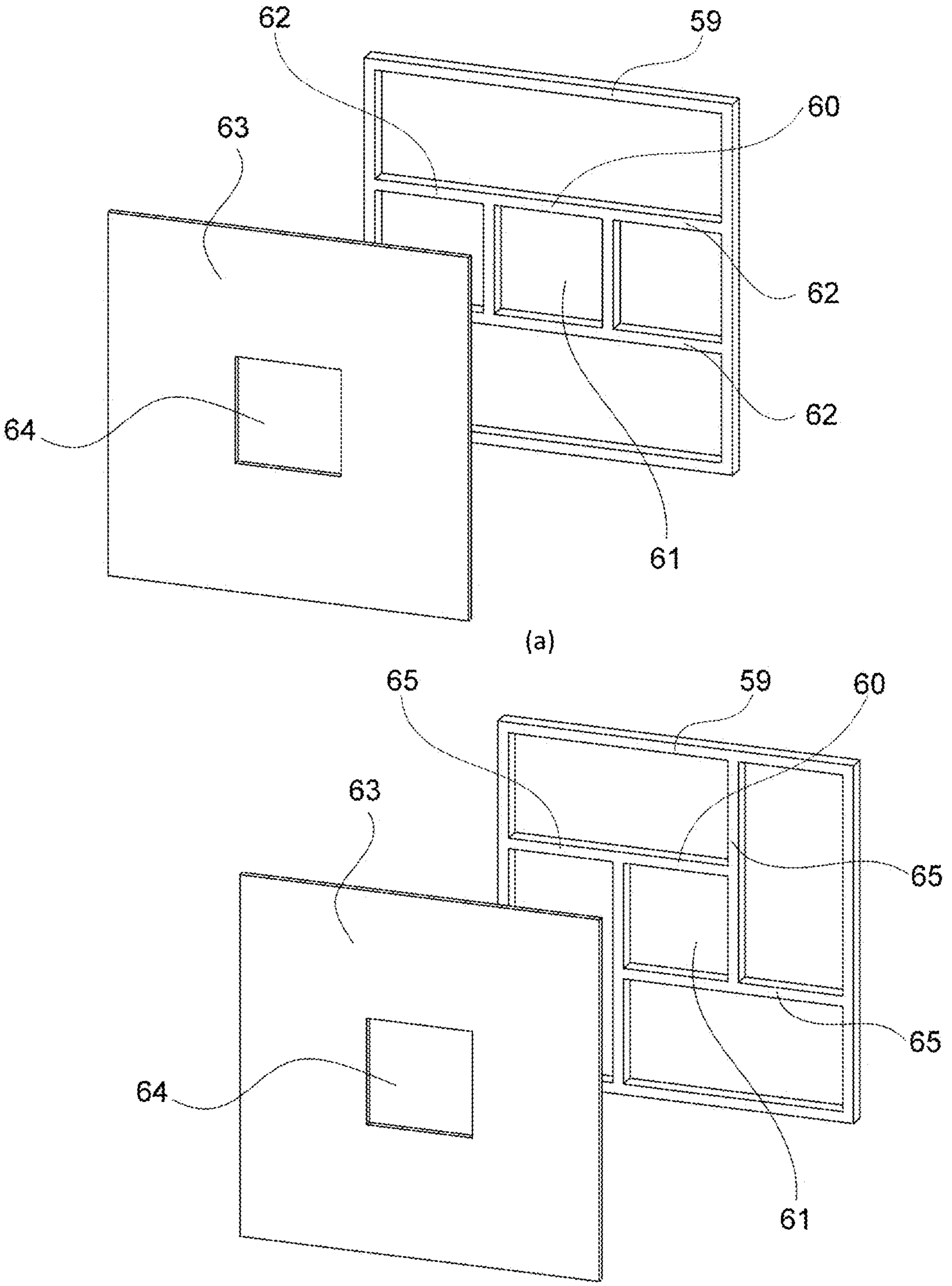
FIG. 15 is a schematic drawing of the two types of acoustic metamaterial structural units placed large size of holes deriving from Example 4.

FIG. 15 is a schematic drawing of the two types of acoustic metamaterial structural units placed large size of holes deriving from Example 4. Wherein, the constraint perforated with large size of holes in FIG. 15 (*a*) is corresponding to the constraint in Example 4 that only the left side, right side and the frame of the whole unit connected the two sides are retained. The constraint perforated with large size of holes in FIG. 15 (*b*) is corresponding to the constraint in Example 4 that the left side, right side, the top side, the bottom side are connected with the frame of the whole unit.

Figure 16:
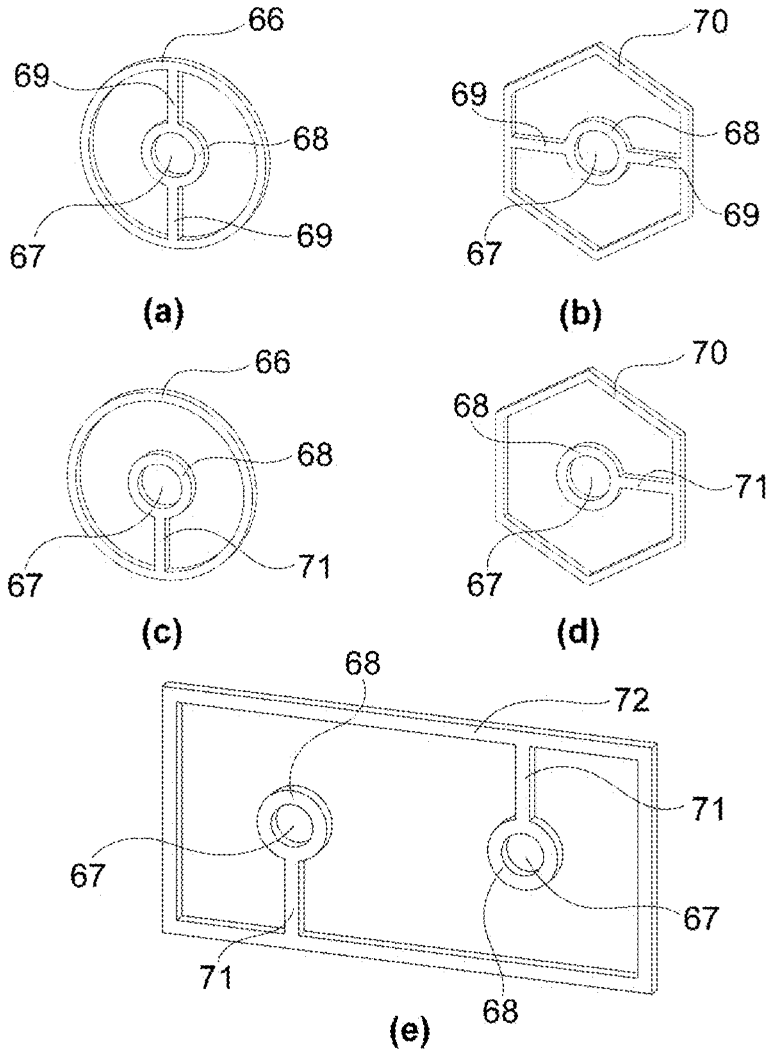
FIG. 16 is a structural schematic drawing of the acoustic metamaterial structural unit with different structural types of frames, the constraint and connection rod in Example 5.

FIG. 16 is a structural schematic drawing of the acoustic metamaterial structural unit with different structural types of frames, the constraint and connection rod in Example 5. Wherein, the shape of the frame is spherical in FIG. 16 (*a*), and the perforated constraint connects with the frame by the double-arm connection rod. The shape of the frame is regular hexagon in FIG. 16 (*b*), and the perforated constraint connects with the frame by the double-arm connection rod. The shape of the frame is spherical in FIG. 16 (*c*), and the perforated constraint connects with the frame by the single-arm connection rod. The shape of the frame is regular hexagon in FIG. 16 (*d*), and the perforated constraint connects with the frame by the single-arm connection rod. In FIG. 16 (*e*), the shape of the frame is rectangular formed by combining the two adjacent square units, and the two perforated constraints respectively connects with the frame by the sing-arm connection rod.

Figure 17:
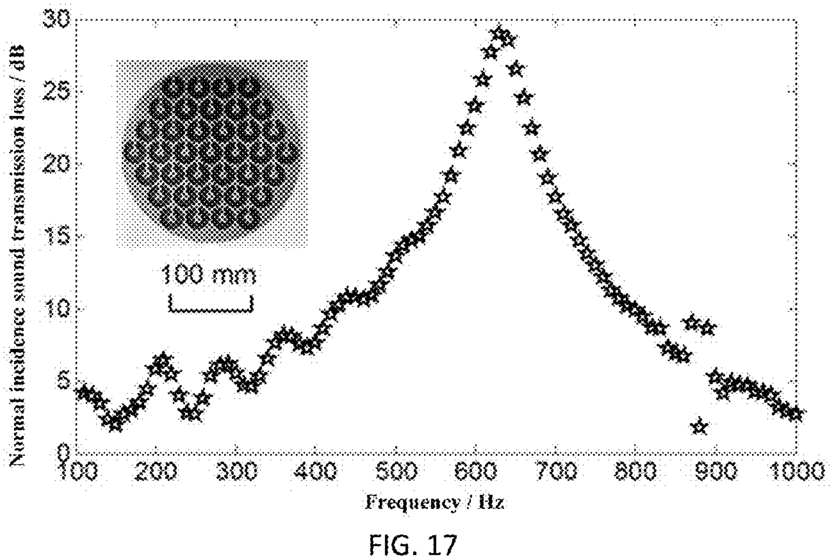
FIG. 17 is the testing result of the incident Sound Transmission Loss in normal direction for the acoustic metamaterial structural unit and the samples the arrays of acoustic metamaterial plates constructed the units in inner surface direction in Example 5, and the acoustic metamaterial structural unit comprises the round frame and the single-arm constraint connection rod.

FIG. 17 is the testing result of the incident Sound Transmission Loss in normal direction for the acoustic metamaterial structural unit (the structure is shown in FIG. 16 (*c*)) and the samples the arrays of acoustic metamaterial plates constructed the units in inner surface direction in Example 5, and the acoustic metamaterial structural unit comprises the round frame and the single-arm constraint connection rod.

Figure 18:
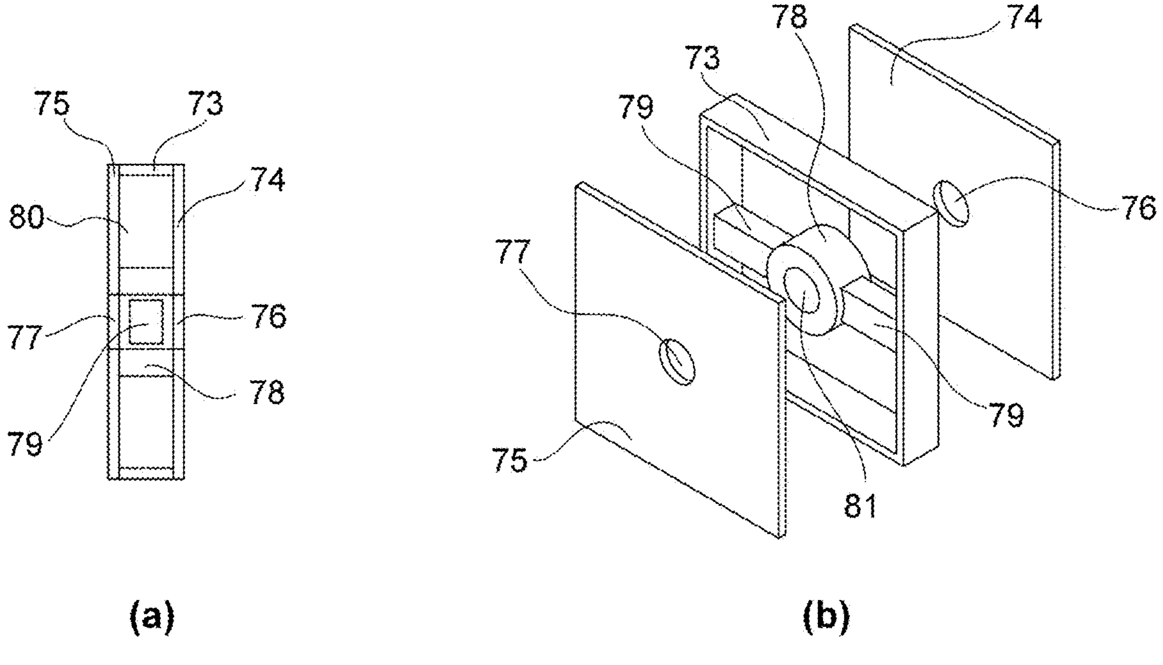
FIG. 18 is a structural schematic drawing of the acoustic metamaterial structural unit covering the membrane on both surfaces in Example 6.

FIG. 18 is a structural schematic drawing of the acoustic metamaterial structural unit covering the membrane on both surfaces in Example 6. FIG. 18 (*a*) is the lateral sectional view of the unit and FIG. 18 (*b*) is the exploded view of the unit.

Figure 19:
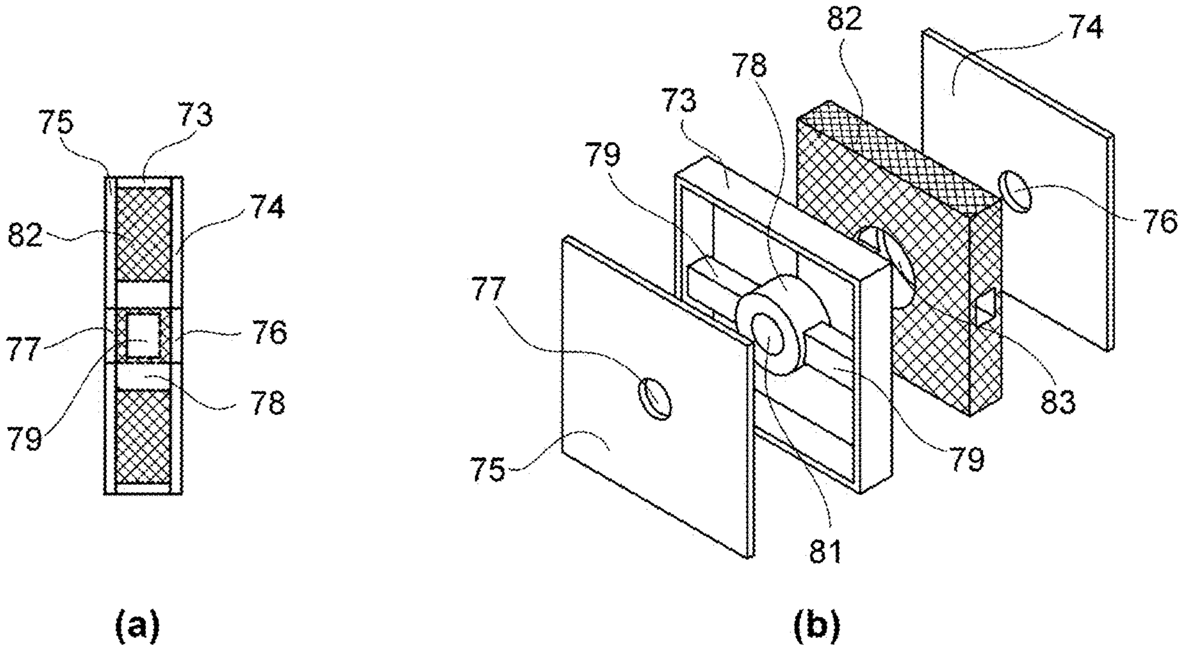
FIG. 19 is a structural schematic drawing of the acoustic metamaterial structural unit covering the membrane on both surfaces and the space between the two perforated membranes filled with the porous material in Example 6.

FIG. 19 is a structural schematic drawing of the acoustic metamaterial structural unit covering the membrane on both surfaces and the space between the first perforated flexible membrane and the second perforated flexible membrane is filled with the porous material, which is improved by the Example 6. FIG. 19 (*a*) is the lateral sectional view of the unit and FIG. 19 (*b*) is the exploded view of the unit.

Figure 20:
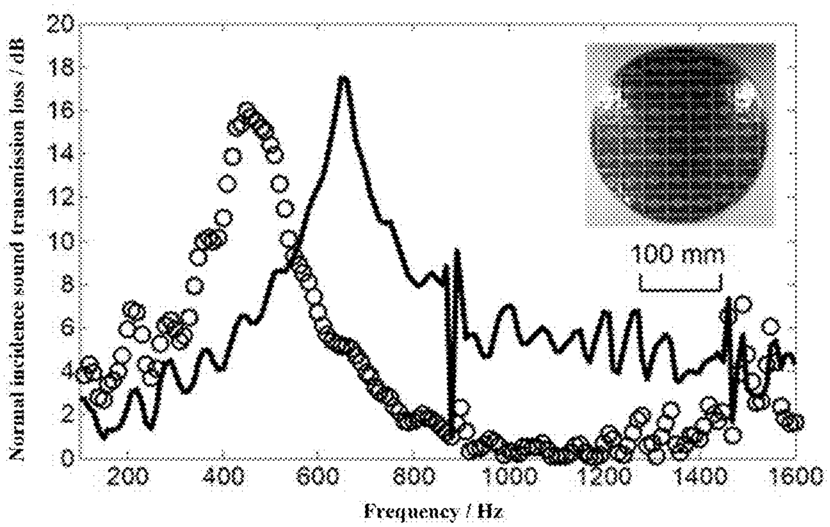
FIG. 20 is a comparative drawing of the testing result of the incident Sound Transmission Loss in normal direction for the sample of the array acoustic metamaterial plate constructed with the acoustic metamaterial structural units covering the membrane on the both surfaces in inner surface direction in example 6 and the sample of the basic acoustic metamaterial structural plate covering the membrane only on one surface in example 1.

FIG. 20 is a comparative drawing of the testing result of the incident Sound Transmission Loss in normal direction for the sample of the array acoustic metamaterial plate constructed with the acoustic metamaterial structural units covering the membrane on the both sides in inner surface direction in example 6 and the sample of the basic acoustic metamaterial structural plate covering the membrane only on one surface in example 1. Wherein, the hollow circle represents the result of the basic acoustic metamaterial structural plate covering the membrane only on one surface in example 1; the solid line represents the result of the sample of the acoustic metamaterial structural units covering the membrane on the both surfaces in example 6.

Figure 21:
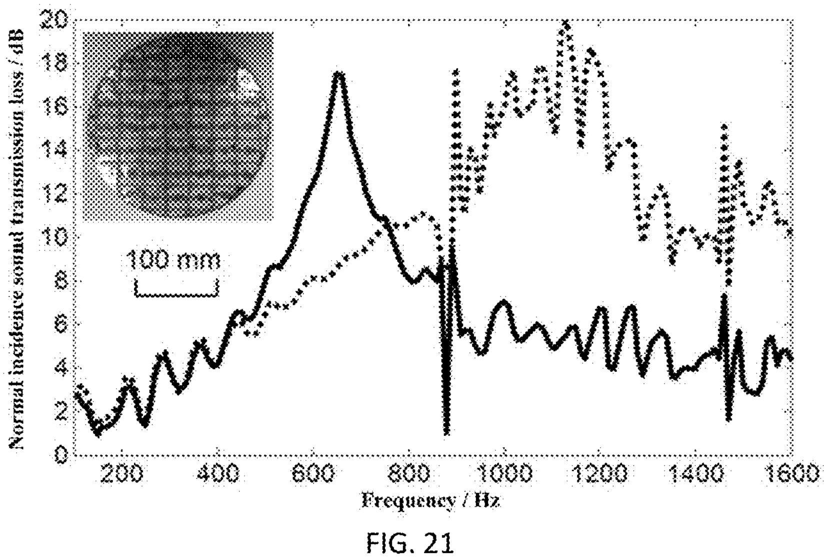
FIG. 21 is a comparative drawing of the testing result of the incident Sound Transmission Loss in normal direction for the sample of the array acoustic metamaterial plate constructed with the acoustic metamaterial structural units covering the membrane on the both surfaces in inner surface direction in example 6 and the sample of the array acoustic metamaterial plate constructed with the acoustic metamaterial structural units in inner surface direction covering the membrane on the both surfaces and the space between the two perforated membranes filled with the porous material in example 6.

FIG. 21 is a comparative drawing of the testing result of the incident Sound Transmission Loss in normal direction for the sample of the array acoustic metamaterial plate constructed with the acoustic metamaterial structural units covering the membrane on the both surfaces in inner surface direction in example 6 and the sample of the array acoustic metamaterial plate constructed with the acoustic metamaterial structural units in inner surface direction covering the membrane on the both surfaces and the space between the two perforated membranes filled with the porous material in example 6.

Figure 22:
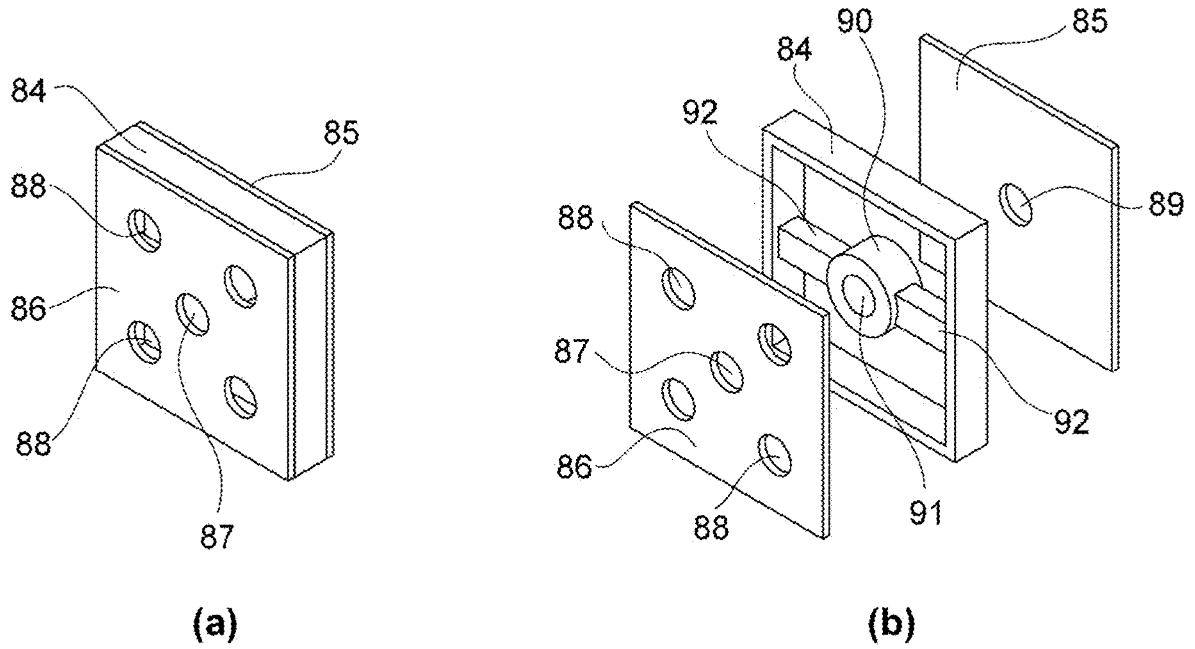
FIG. 22 is the first structural schematic drawing of the acoustic metamaterial structural units with the function of the heat-transferring enhancement in Example 7.

FIG. 22 is the first structural schematic drawing of the acoustic metamaterial structural units with the function of the heat-transferring enhancement in Example 7. The perforated flexible membrane is covered on one side of the acoustic metamaterial unit, on which several hole in different size or in same size are placed. Under the condition that the effect of soundproof of the acoustic metamaterial structural unit is not influenced, the turbulence intensity can be strengthened by increasing the number of holes perforated on the membrane. FIG. 22 (*a*) is the equiaxial lateral sectional view of the unit and FIG. 22 (*b*) is the exploded view of the unit.

Figure 23:
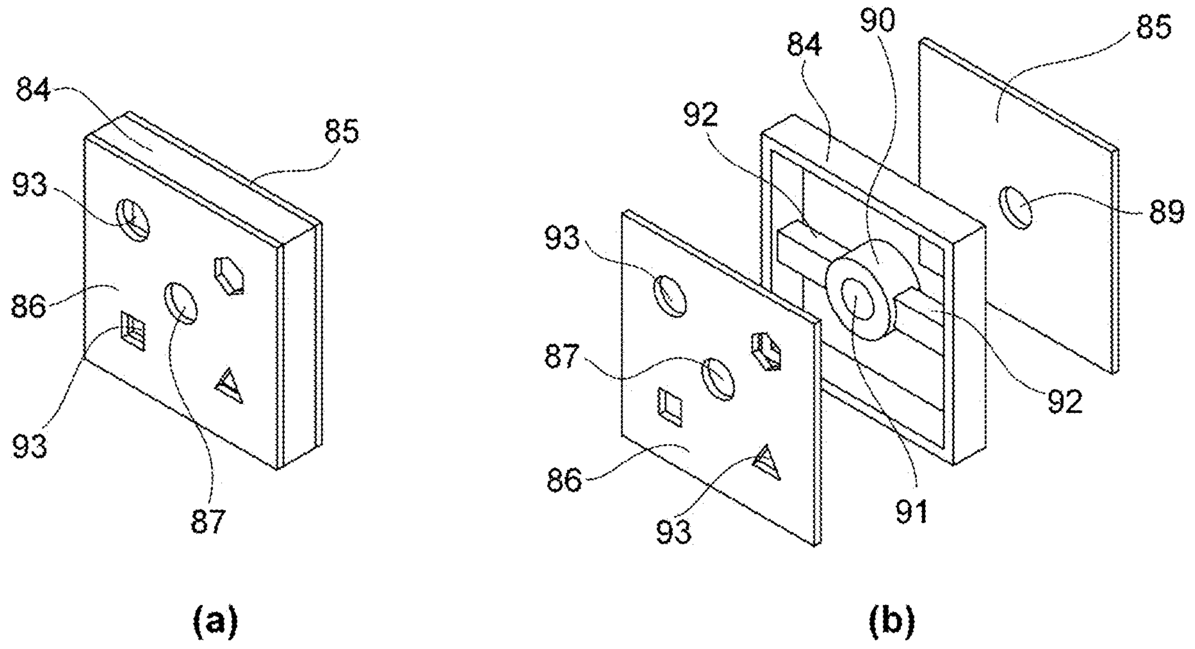
FIG. 23 is the second structural schematic drawing of the acoustic metamaterial structural units with the function of the heat-transferring enhancement in Example 7.

FIG. 23 is the second structural schematic drawing of the acoustic metamaterial structural units with the function of the heat-transferring enhancement in Example 7. The perforated flexible membrane is covered on the other side of the acoustic metamaterial unit, on which several hole in different size and in different shapes are placed. Under the condition that the effect of soundproof of the acoustic metamaterial structural unit is not influenced, the turbulence intensity can be strengthened by perforating different size and different shapes of holes on the membrane. FIG. 23 (*a*) is the equiaxial lateral sectional view of the unit and FIG. 23 (*b*) is the exploded view of the unit.

Figure 24:
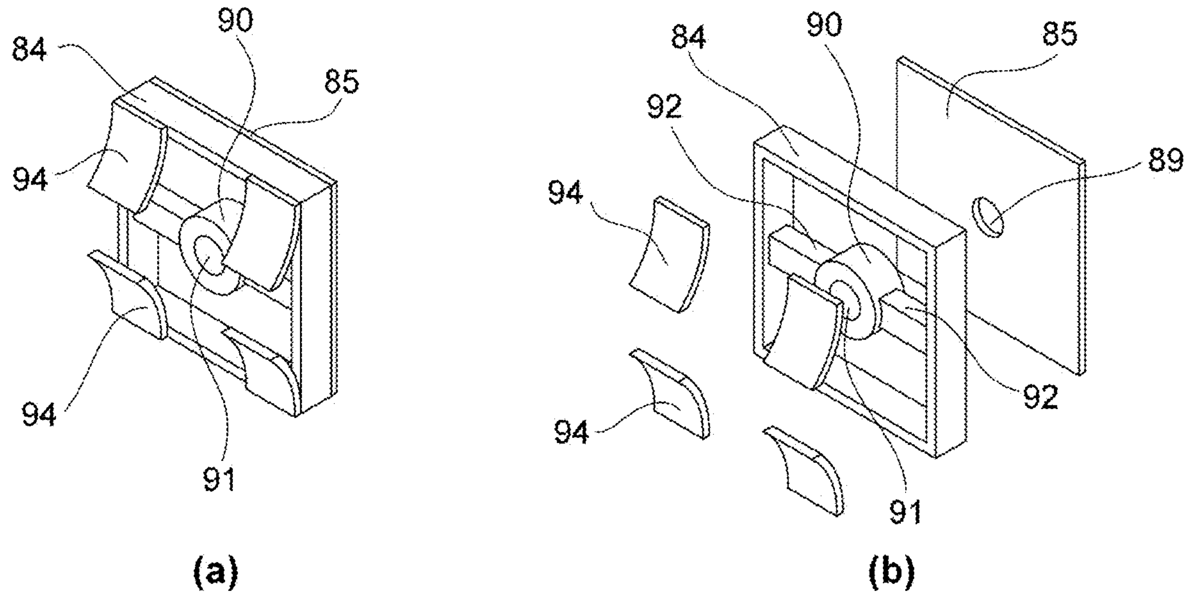
FIG. 24 is the third structural schematic drawing of the acoustic metamaterial structural units with the function of the heat-transferring enhancement in Example 7.

FIG. 24 is the third structural schematic drawing of the acoustic metamaterial structural units with the function of the heat-transferring enhancement in Example 7. The flexible membrane is covered on the other side of the acoustic metamaterial unit, on which several hole in different size and in different shapes are placed. Under the condition that the effect of soundproof of the acoustic metamaterial structural unit is not influenced, the turbulence intensity or the flow rate of the near flow field can be strengthened by swinging or vibration produced by excitation of the incident soundwave. FIG. 24 (*a*) is the equiaxial lateral sectional view of the unit and FIG. 24 (*b*) is the exploded view of the unit.

Figure 25:
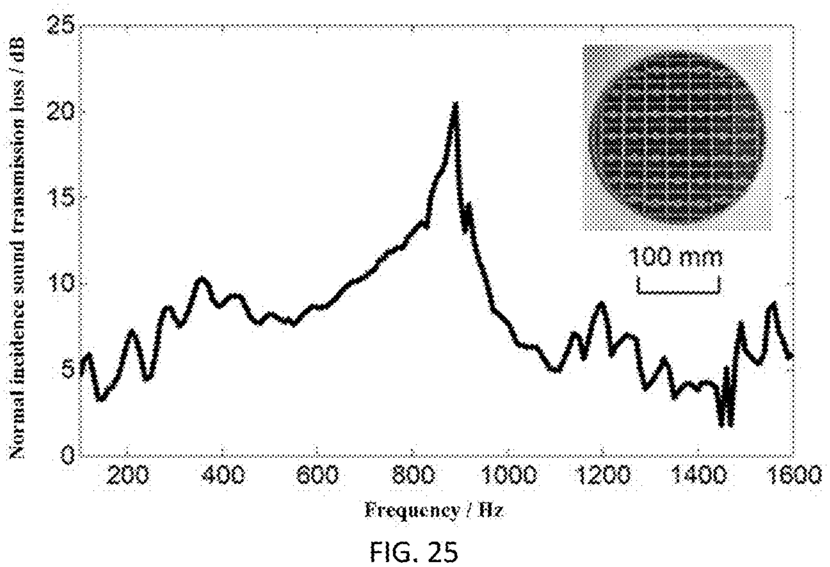
FIG. 25 is the testing result of the incident Sound Transmission Loss in normal direction for the sample of the first structural schematic drawing of the acoustic metamaterial structural units in Example 7.

FIG. 25 is the testing result of the incident Sound Transmission Loss in normal direction for the sample of the first structural schematic drawing of the acoustic metamaterial structural units in Example 7. The sample photo is on the right of the Figure, and the outer diameter is 225 mm.

Figure 26:
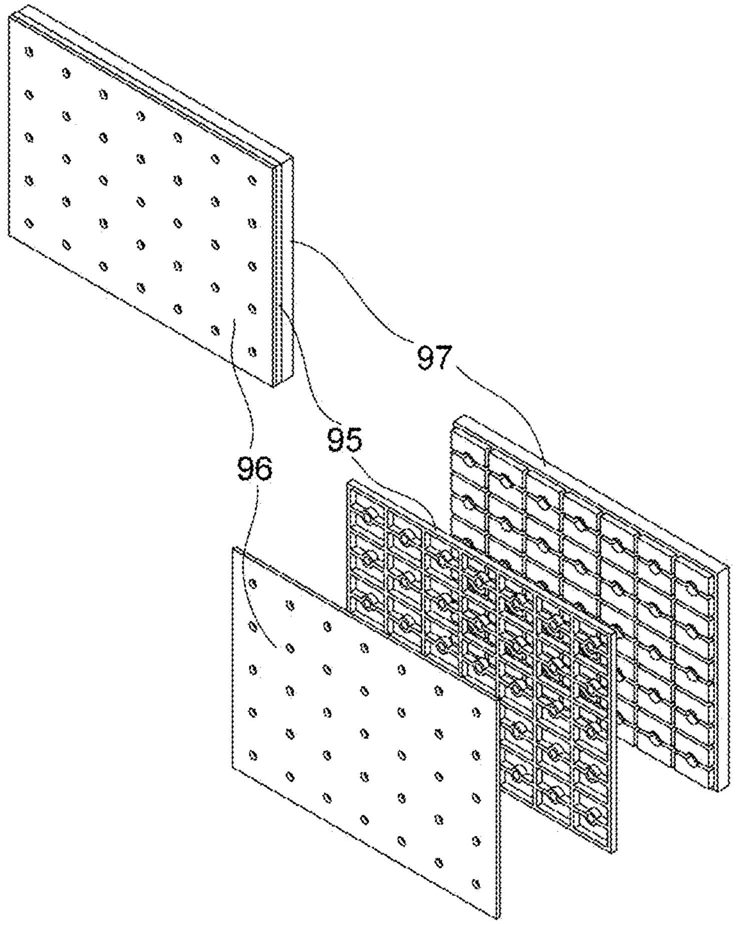
FIG. 26 is the schematic drawing of the acoustic composite structure constructed with the acoustic metamaterial plate and the routine material plate in Example 8.

FIG. 26 is the schematic drawing of the acoustic composite structure constructed with the acoustic metamaterial plate and the routine material plate in Example 8. The routine material plate is placed on the side of the acoustic metamaterial plate (comprises the frame 95 and the perforated flexible membrane 96) facing the incident source. The routine material plate may be porous materials (such as glass fiber or open and closed holes of foam), routine perforated plate, micro-perforated plate, damping material plate and etc. The introduction of routine acoustic material may widen the operating frequency bond of the acoustic metamaterial plate in different extent.

Figure 27:
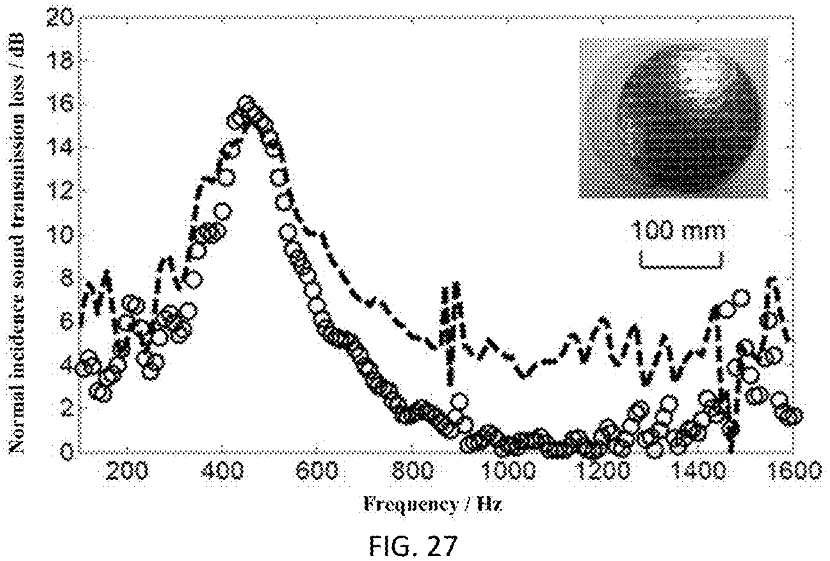
FIG. 27 is the testing result of the incident Sound Transmission Loss in normal direction for the sample of the acoustic composite structure constructed with the acoustic metamaterial plate and the porous materials plate in Example 8.

FIG. 27 is the testing result of the incident Sound Transmission Loss in normal direction for the sample of the acoustic composite structure constructed with the acoustic metamaterial plate and the porous materials plate in Example 8. The sample photo is on the right of the Figure, and the outer diameter is 225 mm. Wherein, the acoustic metamaterial plate is the basic type of the acoustic metamaterial plate in Example 1, and the structural parameters and the materials are same as the shown in FIG. 7 (*a*). The material of the routine acoustic material plate is glass fiber; the thickness is 10 mm and the nominal flow resistivity is 19000 $Nsm^{-4}$. It can be shown from the figures, comparing with the basic type of acoustic metamaterial plate, the Sound Transmission Loss in normal direction of the present acoustic composite structure sample is higher than the basic acoustic metamaterial plate except near the frequency of 440 Hz corresponding to STL spike, especially in mid- or high frequency bond on the right of STL spike. The STL value of the present acoustic composite structure sample is lightly lower than basic acoustic metamaterial plate near the frequency of 440 Hz corresponding to STL spike. The reason is that the introduction of glass fiber is equivalent to increase the structural damping of the basic acoustic metamaterial plate, and the effect of the structural damping mainly embodies the amplitude on the frequency of the gentle resonance and the reflection resonance.

As is mentioned above, for the acoustic metamaterial structural unit whose frame is thicker, the perforated flexible membrane can also be covered on the other side and the porous material can be filled the space between the two layers of the membrane. The soundproof function of the whole acoustic metamaterial increases and the inner space is fully used in the meanwhile. For the acoustic metamaterial structural unit whose frame is thinner, if a layer of perforated flexible membrane is also covered on the other side, the space between the two layers of the membrane is too narrow to fill the porous material. Besides, strong near-field couple produced by the two closely layers of membrane can destroy the operating conditions of the acoustic metamaterial structural unit covering one layer of flexible membrane, which results the soundproof effect becomes worse. In this case, following technical means may be considered: several acoustic metamaterial structural unit whose frame is thinner can be formed two layers or multi-layers of acoustic metamaterial composite plate by stack in the outer vertical direction.

Figure 28:
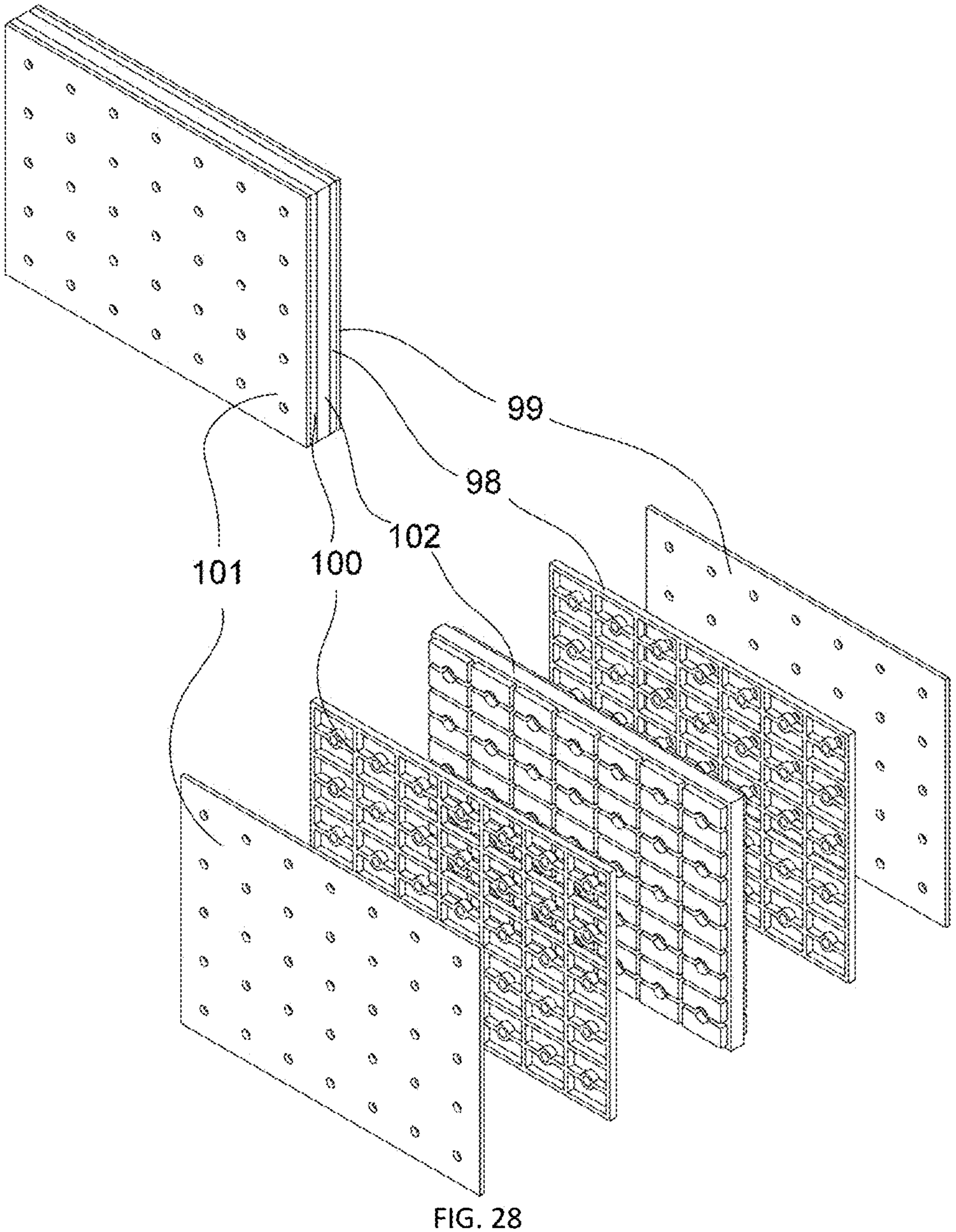
FIG. 28 is the schematic drawing of the acoustic composite plate constructed by two layers of acoustic metamaterial plates that they are pulled so as to form a certain space in Example 9.

FIG. 28 is the schematic drawing of the acoustic composite plate constructed by two layers of acoustic metamaterial plates that they are pulled so as to form a certain space in Example 9.

Figure 29:
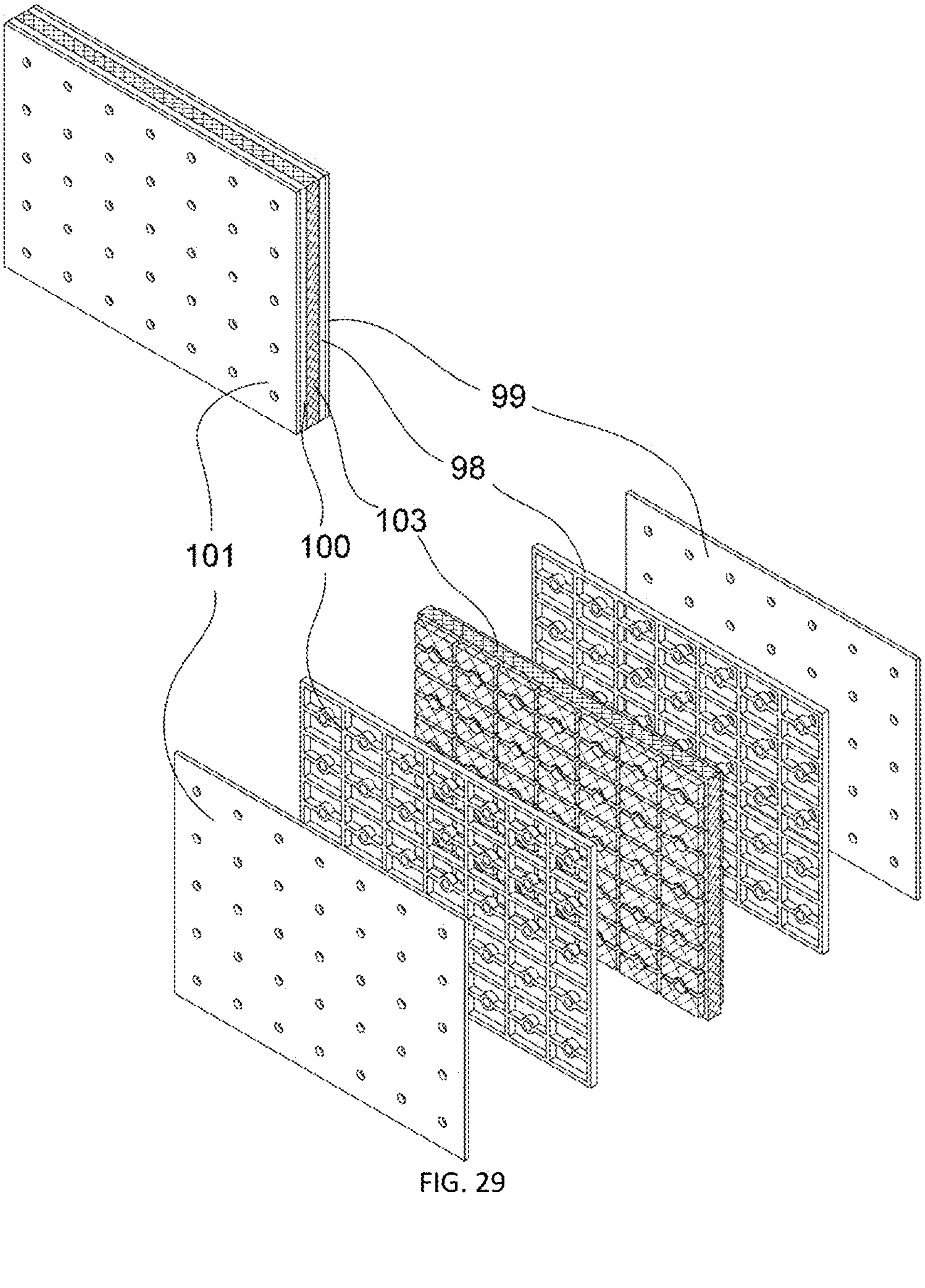
FIG. 29 is the schematic drawing of the acoustic composite plate constructed by two layers of acoustic metamaterial plates that they are pulled so as to form a certain space, and a layer of porous material is inserted in the space in Example 9.

FIG. 29 is the schematic drawing of the acoustic composite plate constructed by two layers of acoustic metamaterial plates that they are pulled so as to form a certain space, and a layer of porous material is inserted in the space in Example 9.

Figure 30:
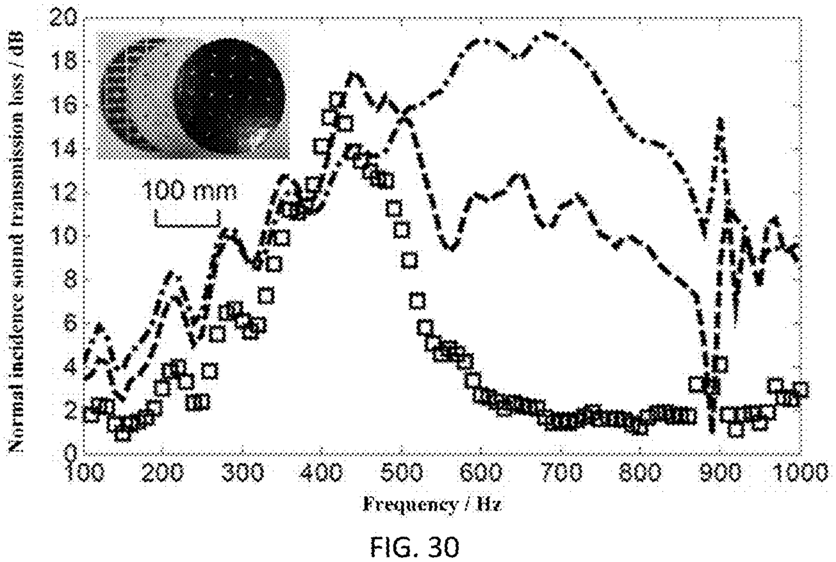
FIG. 30 is the testing result of the incident Sound Transmission Loss in normal direction for the sample of the acoustic metamaterial composite plate in Example 9.

FIG. 30 is the testing result of the incident Sound Transmission Loss in normal direction for the sample of the acoustic metamaterial composite plate in Example 9. The sample photo is on the right of the figure, and the outer diameter is 225 mm. The glass fiber is filled between the two layers of the acoustic metamaterial composite plates with the same structure parameters and material parameters.

Figure 31:
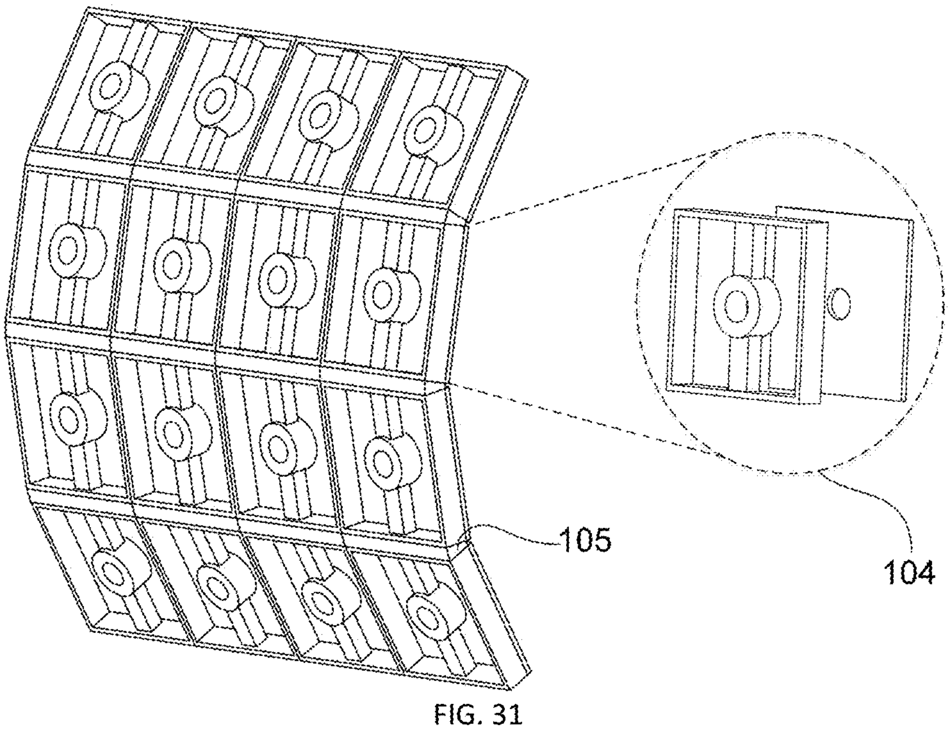
FIG. 31 is the schematic drawing of the acoustic metamaterial plate with the curved surface in Example 10.

FIG. 31 is the schematic drawing of the acoustic metamaterial plate with the curved surface in Example 10.

The acoustic metamaterial structural units (104) of the present invention are connected with wedge connector (105) to form the acoustic metamaterial plate with a certain curvature. The present example is especially suitable for the shell or other installment structure that a certain curvature is required.

EXAMPLES

The testing method and the material resource for carrying out the present invention are stated as follow.

The finite element method (FEM) simulation of the distribution of the stable temperature field of the acoustic metamaterial plate under the situation of the convection heat transfer is stated as follows. The FEM calculation model of the acoustic metamaterial plate is built based on the Acoustic-Solid Interaction, Frequency Domain Interface (Laminar Flow Conjugate Heat Transfer Interface, Stationary), a module in a finite-element analysis and solver software package, COMSOL Multiphysics 5.2. This simulation model comprises “solid physical fields for heat-transferring”, “fluid physical fields for heat-transferring" composed of the incident chamber and transmitting chamber, and "Laminar Flow field". Heat source is placed in the incident chamber and the total power of the heat source is defined. The incident air cavity is also called as "heat source room". The air entrance is placed on one side of the incident chamber, and the initial temperature and the average flow rate of the air are determined here. The air exit is placed on one side of the transmitting chamber, and the transmitting chamber is also called as "transmitting room". Except the side placed the acoustic metamaterial plate of the two rooms, all other sides of the two rooms are designed as insulation wall. Then, steady calculation is carried out by the built-in steady implicit solver of the software. After the steady calculation, the temperature field distribution is visualized by the post-treatment module of the software.

Calculation method for the FEM simulated STL of acoustic metamaterial units: The FEM calculation model of the acoustic metamaterial plate is built based on the Acoustic-Solid Interaction, Frequency Domain Interface (Laminar Flow Conjugate Heat Transfer Interface, Stationary), a module in a finite-element analysis and solver software package, COMSOL Multiphysics 5.2. This model comprises "solid physical fields" composed of three structural units, and "the pressure acoustic physical field" composed of the incident chamber and transmitting chamber. Coupling of the two fields is achieved by the acoustic-solid boundary condition. Boundary condition of Floquet periodicity is applied on the unit cell so as to simulate the periodic extension of the unit cells in the practical fabrication. The incident sound waves are set as plane waves with a frequency range from 20 Hz to 1000 Hz, a step of 10 Hz in incident chamber. The plane wave passes through the vertical excitation structure unit in the incident chamber, a part of sound energy is reflected, the other part of sound energy is transmitted into the transmitting chamber. The normal sound transmission loss (Sound Transmission Loss, short for STL) can be calculated by the energy of incident waves and transmitted waves:

$$STL=20\log_{10}|P_I/P_T|$$

In the equation above, $P_I$ is the incident acoustic pressure amplitude. $P_T$ is the transmitted acoustic pressure amplitude. They can be obtained by post-treatment module of the software COMSOL.

Measurement method for testing the normal incident sound transmission loss for the sample in the acoustic impedance tube: According the standard E2611-09 set by ASTM (American Society for Testing and Materials), "Standard test method for measurement of normal incidence sound transmission of acoustical materials based on the transfer matrix method", STL is measured by the four-microphone method in the impedance tube.

The materials used in following examples are commercially available, for example, FR-4 glass fiber, 6063 grade aluminum alloy, Q235A common carbon steel, polyvinyl chloride film, polyethylene film, polyetherimide film and like high polymer.

Example 1 the Preparation of Basic Type of Acoustic Metamaterial Plate and the Test of the Properties The preparation of basic type of acoustic metamaterial plate and the test of the property are illustrated on the basis of the FIGS. 2-8 as follows 1. The Preparation of Basic Type of Acoustic Metamaterial Plate Sample The FR-4 glass fiber is milled to the frame as shown in FIG. 2. The width of the frame (8) is 2 mm, and the frame comprise a series of acoustic metamaterial structure units (14) with the same geometric shapes. The shape of each unit is square; the inner side length is 27 mm; the outer side length is 29 mm, and the thickness is 5 mm. In the same way, the FR-4 glass fiber is made to be the perforated constraint (11) as shown in FIG. 2. The frame (8) is rigidly connected with the perforated constraint (11) by the double-arm rod (13), the specific connection type is produced by the integral forming process (milling process). The outer contour diameter of the perforated constraint (13) is 10 mm, and the diameter of the hole (12) perforated on the constraint is 5 mm. The section of the double-arm connection rod (13) rigidly connected the constraint (11) and the frame (8) is rectangular, which the length is 4 mm and the width is 3 mm. The whole piece of the perforated flexible membrane (9) whose thickness is 0.05 mm is covered on the one side of the frame (8) and the perforated constraint (11) under the freely spreading situations. The diameter of the hole is also 5 mm and it is corresponding to the hole perforated on the constraint.

During the practical operation, the hole (10) on the perforated flexible membrane (9) can be perforated by drilling, punching and digging after the perforated flexible membrane (9) is covered so as to avoid the situation that the holes on the perforated membrane and the constraint cannot be one-to-one correspondent. The material of the perforated flexible membrane (9) is polyetherimide film, and the type of covering is gluing. Finally, the basic acoustic metamaterial plate sample is obtained.

2. The Property Simulation of the Basic Acoustic Metamaterial Plate Sample

FIG. 3 is the finite element method (FEM) simulation result of the distribution of the stable temperature field of the basic type of the acoustic metamaterial plate (15) under the situation of the convection heat transfer in example 1. Wherein, in the FEM simulation mode, the white cylinder is defined as heat source (18), and the total power is 10 W. The white arrow represents the air inflow direction (19), the initial temperature of the cross-section is designed as 20° C., and the average flow rate of the air is 0.2 m/s. The model further comprises heat resource room (16) and heat delivery room (17). Except the side placed the basic type of the acoustic metamaterial plate of the two rooms, all other sides of the two rooms are designed as insulation wall. From the calculation result of the FEM, it can be seen that the higher temperature of the temperature field is 25° C. and the temperature of most area is near the room temperature (20° C.), which demonstrates that the function of ventilation and heat dissipation of the basic type of the acoustic metamaterial plate is good and the heat energy is not accumulated near the heat source. Therefore, when the basic type of the acoustic metamaterial plate in Example 1 is installed on one side of the insulated and closed chamber, there is no heat dissipation obstacle existing.

In order to reduce the calculation complexity, only one acoustic metamaterial structural unit is used in the FEM calculation model. The boundary condition of the unit is set as the Floquet periodic boundary condition, which is used for simulating the boundary installment of the whole piece acoustic metamaterial plate. As shown in FIG. 4, during designing the FEM simulation mode, the front side and the back side of the structural unit respectively places the incident acoustic chamber (11) and the transmission acoustic chamber (12). In the meanwhile, both of the ends of the two acoustic chambers respectively place the acoustic absorption boundary, which avoids the calculation result is influenced by multi-reflections of soundwave. The incident soundwave from the incident acoustic chamber (11) strikes on the structural unit, and the reflection soundwave $P_R$ and the transmitter soundwave $P_T$ are produced. The Sound.Transmission Loss in normal direction is calculated by STL=20 $\log_{10}|P_I/P_T|$.

3. The Properties Test of the Basic Acoustic Metamaterial Plate Sample

The incident Sound Transmission Loss of the acoustic material sample in normal direction is measured by the four-sensor method according to the standard of ASTM E2611-09. FIG. 7 is a schematic drawing of acoustic impedance tube test system. The acoustic impedance tube comprises the incident acoustic tube of the acoustic impedance tube (25) and the transmission acoustic tube (26) of the acoustic impedance tube (26); The acoustic source (24) placed on the acoustic impedance tube (25). The white noise excitation incident soundwave (31) in broad frequency produced by the acoustic source is developed to be the plane sound wave before it reaches the tested sample (30), which the wave-front amplitude tends to uniform. The soundwave vertically strikes on the front side of the tested sample (30). the absorption sound wedge (27) placed on the end of the transmitting acoustic impedance tube (26) can reduce the influence of the several times of reflection of the sound for the test result. Besides, four terminals for fixing the microphones (28) are placed on the two sides of the testing sample. The microphones (29) (Mode: 4187, Brüel & Kjær) are inserted into the terminals for fixing the microphones, each two of which respectively are used for the incident acoustic tube of the acoustic impedance tube (25) and the transmission acoustic tube of the acoustic impedance tube (26). The acoustic pressure frequency spectrum is tested by the four microphones, and further the delivery function is calculated. Finally, the incident Sound Transmission Loss of the acoustic material sample is obtained. The effective tested frequency bond is 70 Hz~890 Hz for the testing system, which covers third octave frequency bond of the central frequency of 80 Hz~800 Hz. The central line of the soundproof curve can also reflect the soundproof level of the sample factually in other frequency except the said frequency bond. Therefore, when the frequency bond of the testing soundproof result reaches the upper limit of 1600 Hz, it also reflects the soundproof ability of the sample truly and effectively.

4. Comparison with the Prior Art

It mainly compares the Sound Transmission Loss in normal direction for the acoustic metamaterial structural unit, the routine perforated plate with the same sizes of holes, and the micro-perforated plate with the same area density and the same perforation rate here. Refer to FIG. 4. The thickness of the routine perforated plate (20) with the same area density and the same perforation rate is 1.2 mm; the material is 6063 Aluminum alloy and the diameter of the hole is 5 mm. The thickness of the micro-perforated plate (21) with the same area density and the same perforation rate is 1.2 mm; the material is 6063 Aluminum alloy and the diameter of the hole is 1 mm. The area density of the three structural units is 3.56 $kg/m^2$ and the perforation rate of the three structural units is 2.33%.

FIG. 5 is a comparative drawing of the finite element method (FEM) simulation results of the three structural units. Wherein, the solid line represents the acoustic metamaterial structural unit (14), the dashed line represents the routine perforated plate unit (20) with the same sizes of holes and the same area density, and the dotted line represents the micro-perforated plate unit (21) with the same sizes of holes and the same area density. From the figure, it can see that the Sound Transmission Loss in normal direction of the acoustic metamaterial structural unit (14) is higher than the routine perforated plate unit (20) with the same sizes of holes and the same area density in the frequency bond lower than 680 Hz. The Sound Transmission Loss in normal direction of the acoustic metamaterial structural unit (14) is higher than the micro-perforated plate unit (21) with the same area density and the same perforation rate in the frequency bond lower than 880 Hz. Besides, the curve of the Sound Transmission Loss in normal direction of the acoustic metamaterial structural unit (14) appears a spike in the frequency of 440 Hz, and the STL value reaches 17 dB. The spike STL value is higher than the micro-perforated plate unit (21) with the same area density and the same perforation rate about 14 dB, and higher than the routine perforated plate unit (20) with the same sizes of holes and the same area density about 15.4 dB. Besides, it can be seen that the function of the low-frequency soundproofing for the micro-perforated plate unit (21) with the same area density and the same perforation rate is worst, which directly relates to the fact that the Helmholtz Resonant Absorber cannot be formed without the back plane structure.

In order to verify the correctness of the FEM mode, FIG. 8 shows a comparative drawing of the testing result of the incident Sound Transmission Loss in normal direction for the samples of acoustic metamaterial structural unit in Example 1 and the routine perforated plate with the same area density and the same sizes of holes. The comparison between the result and the finite element method (FEM) simulation results in FIG. 5. Wherein, FIG. 8 (*a*) is the finite element method (FEM) simulation result of the acoustic metamaterial structural unit (14) in Example 1. The solid line is the simulation result of the FEM, and the hollow circle is the testing result. The photos of the back surface and front surface of the sample are respectively shown on the left and right of the figure. The diameter of outer circle is 225 mm, which comprises more than 40 whole acoustic metamaterial structural units, and the influence of the installment boundary condition for the whole plate is eliminated. From the STL frequency spectrogram, the two are anastomoses good in the frequency bond of 100 Hz~1000 Hz, and they appears spike in frequency of 440 Hz, which proves that the FEM mode is used for analyzing the properties of the acoustic metamaterial structural unit is believable. FIG. 8 (*b*) is the finite element method (FEM) simulation result of the routine perforated plate unit with the same area density and the same sizes of holes. The geometric size and the material parameters is same as 20 shown in FIG. 3. The dashed line is the simulation result of the FEM, and the hollow circle is the testing result. The photo of the sample is shown on the left of the figure. The diameter of outer circle is 225 mm. The two are anastomoses good in the frequency bond of 100 Hz~1000 Hz, which proves that the FEM mode is used for analyzing the properties of the acoustic metamaterial structural unit is believable. FIG. 8 (*c*) is the finite element method (FEM) simulation result of the micro-perforated plate unit (The geometric size and the material parameters is same as 21 shown in FIG. 4). The dotted line is the simulation result of the FEM, and the hollow triangle curve is the testing result. The photo of the sample is shown on the left of the figure. The diameter of outer circle is 225 mm. The two are anastomoses good in the frequency bond of 100 Hz~000 Hz, which proves that the FEM mode is used for analyzing the properties of the acoustic metamaterial structural unit is believable. The comparison between the testing result and the FEM simulation result of the three samples can proved that the designed FEM mode used for analyzing the properties of the acoustic metamaterial structural unit is correct and effective.

5. Operation Mechanism Analysis

FIG. 6 shows the finite element method (FEM) simulation results of speed directions of the air particles in incident acoustic chamber and the transmission acoustic chamber for the acoustic metamaterial structural unit (14), the routine perforated plate unit (20) with the same sizes of holes and the same area density, and the micro-perforated plate unit (21) with the same area density and the same perforation rate is excited by the soundwave frequency of 440 Hz. Wherein, FIG. 6 (*a*) is the finite element method (FEM) simulation result of the acoustic metamaterial structural unit (14); FIG. 6 (*b*) is the finite element method (FEM) simulation result of the routine perforated plate unit (20) with the same sizes of holes and the same area density, and FIG. 6 (*c*) is the finite element method (FEM) simulation result of the micro-perforated plate unit (21) with the same area density and the same perforation rate. The left black crude arrow represents the inflow direction of the soundwave. The soundwave is plane wave, that is to say, the wave-front amplitude is uniform, which is set 1 Pa in the FEM mode. The black thin arrow represents the speed direction of the air particles. It can be seen from the figure, when the acoustic metamaterial structural unit (14) is excited by the soundwave frequency of 440 Hz, the speed vortex of the air particles obviously appears, and the direction of the air particles is vertical with and even is opposite with the direction of the incident soundwave. On the contrast, when the routine perforated plate unit (20) with the same sizes of holes and the same area density shown in FIG. 6 (*b*) and the micro-perforated plate unit (21) with the same area density and the same perforation rate shown in FIG. 6 (*c*) are excited by the soundwave frequency of 440 Hz, the air particles directions of the both sides are uniform, which is same as the direction of the incident acoustic soundwave. After the comparison, intuitively, the speed vortex produced by the air particles makes the corresponding normal incident Sound Transmission Loss curve of the acoustic metamaterial structural unit (14) appears the spike in the same incident frequency (combine with FIG. 5). The physical mechanism is stated as follows. Under the frequency, the unperforated area of the flexible membrane of the acoustic metamaterial structural unit (14) produces the opposite vibration mode with the frame and the constraint, which makes acoustic field corresponding to the area is opposite and counteract with the continued acoustic field produced by the holes perforated on the constraint and the flexible membrane, and further, the acoustic pressure of amplitude tends to the minimum, which is only 0.0323 Pa in the simulation mode. The acoustic pressure in the incident chamber is partly rebounded by the acoustic metamaterial structural unit (14) and reaches the maximum value of 1.84 Pa, which is higher than the minimum value about 1.8077 Pa. Under the same condition which is excited by the soundwave frequency of 440 Hz, the other two structural units do not appear the similar speed vortex of the air particles. The whole structural unit moves in the same phase, which makes the near air particles move in the same direction and the difference of the absolute value of the acoustic pressure amplitude between the incident chamber and the transmitting chamber is small. It reflects that there is no spike on the normal incident Sound Transmission Loss curve and the value is not as high as the acoustic metamaterial structural unit (14)

Example 2 The Preparation of the Thin and Light Type of the Acoustic Metamaterial Plate and the Test of the Properties 1. The Preparation of the Thin and Light Type of Acoustic Metamaterial Plate Sample As is shown in FIG. 9, the frame (32) is produced by the laser cutting with the grade Q235A common carbon steel. The width is 3 mm, and the thickness is 1.5 mm. The frame comprises a series of acoustic metamaterial structure units (38) with the same geometric shapes. The shape of each unit is square; the inner side length is 35 mm. In the same way, the grade Q235A common carbon steel is made to be the perforated constraint (35). The frame (32) is rigidly connected with the perforated constraint (35) by the double-arm rod (37), the specific connection type is produced by the integral forming process. The outer contour diameter of the perforated constraint (35) is 10 mm, and the diameter of the hole (36) perforated on the constraint is 5 mm. The section of the double-arm connection rod (37) rigidly connected the constraint (37) and the frame (32) is rectangular, which the length is 3 mm and the width is 1.5 mm. The whole piece of the perforated flexible membrane (33) whose thickness is 0.05 mm is covered on the one side of the frame (32) and the perforated constraint (37) under the freely spreading situations. The diameter of the hole is also 7 mm and it is corresponding to the hole perforated on the constraint. The hole (34) on the perforated flexible membrane (33) can be perforated by drilling, punching and digging after the perforated flexible membrane (33) is covered so as to avoid the situation that the holes on the perforated membrane and the constraint cannot be one-to-one correspondent. The material of the perforated flexible membrane (33) is polyetherimide film, and the type of covering is gluing. Finally, the thin and light type of acoustic metamaterial plate sample is obtained as shown in FIG. 9. The maximum difference between the present thin and light type of acoustic metamaterial structural unit and the basic acoustic metamaterial plate sample in Example 1 is stated as follows. The connection rod (37) that is connected the perforated constraint (35) and the frame (32) of the acoustic metamaterial structural units (38) is flush with the frame, so it avoids the design of the subsidence surface, which simplifies the process complexity. Further, the thickness of the whole acoustic metamaterial plate can be thinner. The area density of the present thin and light type of acoustic metamaterial plate is 4.20 $kg/m^2$ and the perforation rate is 3.48%.

2. The Properties Test of the Basic Acoustic Metamaterial Plate Sample

FIG. 10 is the testing result of the incident Sound Transmission Loss in normal direction for the light and thin acoustic metamaterial plate in Example 2. The sample photo is on the right of the Figure, and the outer diameter is 225 mm. It comprises 21 whole acoustic metamaterial structural units. It can be seen from the figure that the spike appears in the frequency of 400 Hz and the corresponding STL value reaches to about 17 dB. The frequency bond that the STL value in the normal incident Sound Transmission Loss spectrogram of the present acoustic metamaterial plate sample is higher than 6 dB is 300 Hz~520 Hz.

Example 3: The Preparation of The Acoustic Metamaterial Plate Comprising Units in Different Parameters and the Test of the Properties 1. The Preparation of the Acoustic Metamaterial Plate Comprising Units in Different Parameters The schematic drawing of the acoustic metamaterial structural unit and the acoustic metamaterial plate constructed the units with different parameters in inner surface direction in Example 3 is shown in FIG. 11. The structure sizes of the acoustic metamaterial structural units as the basic array element are different. The diameter of the inner constraint is different from the diameter of the holes perforated on the constraint. Take a certain acoustic metamaterial structural unit (45) as an example, the connection rod (44) connected the perforated constraint (42) and the frame (39) of the acoustic metamaterial structural units (45) is flush with the frame (39). The structure is similar with the acoustic metamaterial structural unit (38) in Example 2. The present acoustic metamaterial plates comprise four acoustic metamaterial structural units with different size parameters. The shape of the frame of each piece of acoustic metamaterial structural unit is square. The inner side length is 35 mm; the width of the outer frame (46) is 3 mm; the thickness is 1.5 mm. The diameters of the outer contour of the perforated constraint (42) comprises four different sizes, from low to high are 5 mm, 10 mm, 12 mm, 15mm. The diameters of the holes perforated on the constraint comprise three sizes, from low to high are 3 mm, 5 mm, 10 mm (36). The whole piece of the perforated flexible membrane (40) that the thickness is 0.05 mm is covered on the one side of the frame (39) under the freely spreading conditions and any pretension is not exerted on the membrane. The diameter of the hole (41) perforated on the membrane is same as the hole (43) perforated on the constraint (36). The cross-section of the connection rod (44) is rectangular whose length is 3 mm and the width is 1.5 mm. The materials of the frame (39), the perforated constraint (42) and the double-arm connection rod (44) is common carbon steel with the grade of Q235A, and they are same. The material of the perforated flexible membrane is polyetherimide. The area density of the thin and light acoustic metamaterial plate is 4.40 kg/m$^2$ and the perforation rate is 3.22%.

2. The Properties Test of the Basic Acoustic Metamaterial Plate Sample

FIG. 12 is the testing result of the incident Sound Transmission Loss in normal direction for the samples acoustic metamaterial plate constructed the units with different parameters in Example 3. The sample photo is on the right of the Figure, and the outer diameter is 225mm. It comprises 21 whole acoustic metamaterial structural units. It can be seen from the figure that the spike appears in the frequency of 430 Hz and the corresponding STL value reaches to about 21 dB. The frequency bond that the STL value in the normal incident Sound Transmission Loss spectrogram of the present acoustic metamaterial plate sample is higher than 6 dB is 210 Hz~600 Hz. The reason is that different sized of constraints and the hole perforated on the constraint are used for the different acoustic metamaterial structural units, and several STL spikes are produced and further the operating frequency bond is obviously widened.

Example 4: The Preparation of the General Acoustic Metamaterial Structural Unit Placed Large Size of Holes and the Acoustic Metamaterial Plate Constructed the Units in Inner Surface Direction and the Test of the Properties 1. The Preparation of the Acoustic Metamaterial Plate Placed Large Size of Holes As is shown in FIG. 13, the acoustic metamaterial plate constructs the acoustic metamaterial structural unit (51) in inner surface direction by the periodic array. The perforated constraint (48) and the double-arm connection rod (50) of one piece of the structural unit are removed from each of the 3×3 unit array clusters, and the large size of hole is formed. Further, the more general acoustic metamaterial structural unit (58) is formed. The general acoustic metamaterial structural unit (58) comprises the frame (55), the constraint (56) perforated large size of holes (47) and the connection rod (57). There are two types of sizes of holes perforated on the flexible membrane (52), which are small size of hole (53) and large size of hole (54).

The shape of the frame of each piece of acoustic metamaterial structural unit is square. The inner side length is 35 mm; the width of the outer frame (46) is 3 mm; the thickness is 1.5 mm. The diameter of the outer contour of the perforated constraint (48) is 8 mm. The diameter of the holes (49) perforated on the constraint is 3 mm. The whole piece of the perforated flexible membrane (52) that the thickness is 0.05 mm is covered on the one side of the frame (46) under the freely spreading conditions and any pretension is not exerted on the membrane. The diameter of the small size of hole (53) perforated on the membrane is same as the small size of hole (49) perforated on the constraint, and they are both 3 mm. The diameter of the small size of hole (54) perforated on the membrane is same as the small size of hole (47) perforated on the constraint, and they are both 35 mm.

The cross-section of the connection rod (50) connected the constraint (48) and the frame (46) is rectangular whose length is 3 mm and the width is 1.5 mm. The materials of the frame (46), the perforated constraint (48) and the double-arm connection rod (50) is common carbon steel with the grade of Q235A, and they are same. The material of the perforated flexible membrane is polyetherimide. The area density of the thin and light acoustic metamaterial plate is 3.66 kg/m$^2$ and the perforation rate is 21.70%.

2. The Properties Test of the General Acoustic Metamaterial Plate Sample

FIG. 14 is the testing result of the incident Sound Transmission Loss in normal direction for the samples acoustic metamaterial plate constructed the units with the large size of holes in Example 4. The sample photo is on the left of the Figure, and the outer diameter is 225 mm. It can be seen from the figure that the spike appears in the frequency of 950 Hz and the corresponding STL value reaches to about 23 dB. Comparing the above results with the Examples 1-3, the effective operating frequency of the present acoustic metamaterial plate sample appears on higher frequency bond, and the bandwidth is also obvious narrower than any one of the Examples 1-3. In spite of this, the perforation rate of the present acoustic metamaterial plate sample surprisingly reaches 21.70%, which is much beneficial to pass through freely for the fluid.

3.The Derivation Type of the General Acoustic Metamaterial Plate Sample with Large Size of Hole On the basis of the construction, two types of the general acoustic metamaterial structural unit are derived, which is shown in FIG. 15. Wherein, the constraint (60) perforated with large size of holes (61) in FIG. 15 (*a*) is the new connection rod (62) that only the left and the right of the connection rod (57) of the general acoustic metamaterial plate sample (58) are retained to form, which is connected with the frame (59) of the whole unit. The constraint (60) perforated with large size of holes (61) in FIG. 15 (*b*) is the new connection rod (62) that four sides of the left side, the right side, the bottom side and the top side of the connection rod (57) of the general acoustic metamaterial plate sample (58) are retained to form, which is connected with the frame (59) of the whole unit.

Example 5: The Preparation of the Acoustic Metamaterial Structural Unit with Other Shapes of Frames, Connection Rods and Constraint, and the Acoustic Metamaterial Plate Constructed the Units in Inner Surface Direction and the Test of the Properties 1. The Structure of the Acoustic Metamaterial Structural Unit with Other Shapes of Frames, Connection Rods and Constraint Wherein, the shape of the frame (66) is spherical in FIG. 16 (*a*), and the perforated (67) constraint (68) connects with the frame (66) by the double-arm connection rod (69). The shape of the frame (70) is regular hexagon in FIG. 16 (*b*), and the perforated (67) constraint (68) connects with the frame (70) by the double-arm connection rod (69). The shape of the frame (66) is spherical in FIG. 16 (*c*), and the perforated (67) constraint (68) connects with the frame by the single-arm connection rod (71). The shape of the frame (70) is regular hexagon in FIG. 16 (*d*), and the perforated (67) constraint (68) connects with the frame (70) by the single-arm connection rod (71). In FIG. 16 (*e*), the shape of the frame is rectangular formed by combining the two adjacent square units, and the two perforated (67) constraints (68) respectively connects with the frame (72) by the sing-arm connection rod (71). It is worthy to note that the single-arm connection rod is especially fit for the frame with small size, which can further reduce the weight of the whole unit the precondition that the connection rigidity of the frame and the constraint is not changed.

2. The Preparation of the Acoustic Metamaterial Plate with the Spherical Frame and the Single-Arm Connection Rods, and the Properties Test Thereof The Example 5 describes the acoustic metamaterial structural unit with the s spherical frame and single-arm connection rod. The inner diameter of the frame (66) is 30 mm and the thickness is 5 mm. The diameter of the outer contour of the perforated constraint (68) is 8 mm. The diameter of the holes (67) perforated on the constraint is 5 mm. The whole piece of the perforated flexible membrane that the thickness is 0.05 mm is covered on the one side of the frame (46) under the freely spreading conditions and any pretension is not exerted on the membrane. The diameter of the hole perforated on the membrane is same as the hole (67) perforated on the constraint, and they are both 5 mm. The cross-section of the connection rod (71) connected the constraint (68) and the frame (66) is rectangular whose length is 5 mm and the width is 3 mm. The materials of the frame (66), the perforated constraint (68) and the double-arm connection rod (71) is FR-4 glass fiber, and they are same. The material of the perforated flexible membrane is polyetherimide. The area density of the thin and light acoustic metamaterial plate is 4.57 $kg/m^2$ and the perforation rate is 2.78%.

FIG. 17 is the testing result of the incident Sound Transmission Loss in normal direction for the acoustic metamaterial structural unit (the structure is shown in FIG. 16 (*c*) and the samples the arrays of acoustic metamaterial plates constructed the units in inner surface direction in Example 5, and the acoustic metamaterial structural unit comprises the round frame and the single-arm constraint connection rod. It can be seen from the FIG. 17 that the spike appears in the frequency of 630 Hz and the corresponding STL value reaches to about 30 dB. The frequency bond that the STL value in the normal incident Sound Transmission Loss spectrogram of the present acoustic metamaterial plate sample is higher than 6 dB is 210 Hz~600 Hz.

Example 6: The Preparation of the Acoustic Metamaterial Structural Unit Covering the Membrane on Both Sides, and the Acoustic Metamaterial Plate Constructed the Units in Inner Surface Direction and the Test of the Properties 1. The Preparation of the Acoustic Metamaterial Structural Plate Covering the Membrane on Both Sides FIG. 18 is a structural schematic drawing of the acoustic metamaterial structural unit covering the membrane on both surfaces in Example 6. FIG. 18 (*a*) is the lateral sectional view of the unit and FIG. 18 (*b*) is the exploded view of the unit. The first perforated flexible membrane (74) and the second perforated flexible membrane (75) are respectively covered on the both sides of the same acoustic metamaterial structural unit. The diameters of the holes (76) perforated on the first perforated flexible membrane (74), the diameters of the holes (77) perforated on the second perforated flexible membrane (75) and the diameter of the holes perforated on the constraint are same. The example is especially fit for the situation that the thickness of the frame (73) is large. It not only sufficiently uses the other side of the frame, but also a new layer of vibration unit is formed. The two layers of vibration units can realize the superposition and coincidence of multiple layers of vibration unit, which can isolate the soundwave effectively. The present acoustic metamaterial structural unit is obtained by the modification of the basic acoustic metamaterial structural unit in Example 1 that the second perforated flexible membrane is covered on the other side. The material of the second perforated flexible membrane is polyetherimide and the thickness is 0.038 mm. The geometric parameters and the material parameters of other composite elements are same as Example 1.

FIG. 19 is a structural schematic drawing of the acoustic metamaterial structural unit covering the membrane on both surfaces and the space between the first perforated flexible membrane (74) and the second perforated flexible membrane (75) is filled with the porous material (82), which is improved by the Example 6. FIG. 19 (*a*) is the lateral sectional view of the unit and FIG. 19 (*b*) is the exploded view of the unit. The filled porous material (82) may be glass fiber or open and closed holes of foam open and closed holes of foam. It not only can sufficiently use the chamber space between the two layers of the perforated membrane, but also it can obviously strengthen the acoustic function of the whole acoustic metamaterial structural unit. When the two perforated membrane neighbors closely, the near soundwaves are reflected back and forth to produce strong coupling, the acoustic pressure between the two layers of membrane increases drastically and the sound energy density increases. In this case, even r the sound absorption efficiency of the filled porous material also increases remarkably. Thus, under the situation that the thickness and the weight of the acoustic metamaterial structural unit is not increased, the transmitting acoustic energy is reducing remarkably and the better effect for reducing noise is realized. It is worthy to note that the characteristic impedance of the porous materials should match with the membrane, which can avoid the soundwave not entering into the porous material effectively. In the meanwhile, the influence of the filled porous material on the flexural vibration rigidity of the membrane should be considered, and the operating frequency of the original designed acoustic metamaterial structural unit should be modified.

2. The Properties Test of the Acoustic Metamaterial Plate Sample Covering Membrane on Both Sides FIG. 20 is a comparative drawing of the testing result of the incident Sound Transmission Loss in normal direction for the sample of the array acoustic metamaterial plate constructed with the acoustic metamaterial structural units covering the membrane on the both sides in inner surface direction in example 6 and the sample of the basic acoustic metamaterial structural plate covering the membrane only on one side in example 1. The difference of the two examples is that the second perforated flexible membrane is covered on the other side of the acoustic metamaterial structural unit covering membrane on both sides. The sample photo is on the right of the Figure, and the outer diameter is 225 mm. It can be seen from the figure that the spike appears in the frequency of 650 Hz, which is higher than the acoustic metamaterial structural unit sample in Example 1. For the acoustic metamaterial structural unit sample in Example 6, the frequency bond that the STL value in the normal incident Sound Transmission Loss spectrogram of the present acoustic metamaterial structural unit sample is higher than 6 dB is 300 Hz~600 Hz. The reason is that the system characters of the original basic acoustic metamaterial structural unit is changed, when the second perforated flexible membrane is covered on the other side. In particular, on one hand, the structural comprising two layers of membrane and the closed air space can increase the structural rigidity of the original basic acoustic metamaterial structural unit. On the other hand, the vibrational degree of freedom of the system increases, which makes the acoustic metamaterial structural unit possesses both the negative mass property (the movement response is opposite to the direction of the excitation) and the negative volume modulus property (the change of volume is opposite to the direction of the excitation). The metamaterial property is further strengthened.

FIG. 21 is a comparative drawing of the testing result of the incident Sound Transmission Loss in normal direction for the sample of the array acoustic metamaterial plate constructed with the acoustic metamaterial structural units covering the membrane on the both surfaces in inner surface direction in example 6 and the sample of the array acoustic metamaterial plate constructed with the acoustic metamaterial structural units in inner surface direction covering the membrane on the both surfaces and the space between the two perforated membranes filled with the porous material in example 6. The photos of the sample acoustic metamaterial structural units covering the membrane on the both surfaces and the space between the two perforated membranes filled with the porous material is shown on the left of the Figure, and the outer diameter is 225 mm. The filled porous material is glass fiber and the thickness is 10 mm. The nominal resistivity is 19000 $Nsm^{-4}$. The fill of the porous materials makes the STL spike on the originally frequency of 650 Hz moves to the higher frequency bond. Further, the effective soundproof bond in the high frequency bond is further widened.

When the acoustic metamaterial structural unit self is excited by the soundwave or the flow field, the multi-mode local resonance is produced, which can improve the synergy degree between the speed field and the temperature gradient field, and finally the effect of heat-transfer enhancement is realized. Moreover, the enough soundproof property in the low frequency of the acoustic metamaterial structural unit is also considered. The resonance directly corresponds to the result of the full acoustic transmission. On the basis of the above considerations, when the operation condition of the acoustic metamaterial structural unit is not changed or changed a little, for example, one layer containing several perforated flexible membranes or elastic membranes is covered on the other side of the structure unit, these changed structures can realize the effect of heat-transfer enhancement by strong vibrations excited by the soundwave or the flow field. Thus, a batch of the acoustic metamaterial structural units with the function of heat-transfer enhancement and the examples thereof are formed.

Example 7: The Preparation of the Acoustic Metamaterial Structural Unit with the Function of the Heat-Transferring Enhancement and the Acoustic Metamaterial Plate Constructed the Units in Inner Surface Direction and the Test of the Properties 1.Three Different Structures of the Acoustic Metamaterial Structural Unit with the Function of the Heat-Transferring Enhancement FIG. 22 is the first structural schematic drawing of the acoustic metamaterial structural units with the function of the heat-transferring enhancement in Example 7. The perforated flexible membrane (86) is covered on one side of the acoustic metamaterial unit, on which several round holes (88) in different sizes or in same size are placed. Under the condition that the effect of soundproof of the acoustic metamaterial structural unit is not influenced, the turbulence intensity can be strengthened by increasing the number of holes perforated on the membrane. FIG. 22 (*a*) is the equiaxial lateral sectional view of the unit and FIG. 22 (*b*) is the exploded view of the unit. The size of the additional holes (88) on the perforated flexible membrane (86) may be same as or different from the size of the hole (87) originally perforated on the membrane.

FIG. 23 is the second structural schematic drawing of the acoustic metamaterial structural units with the function of the heat-transferring enhancement in Example 7. The perforated flexible membrane (86) is covered on the other side of the acoustic metamaterial unit, on which several holes (93) in different size and in different shapes are placed. Under the condition that the effect of soundproof of the acoustic metamaterial structural unit is not influenced, the turbulence intensity can be strengthened by perforating different size and different shapes of holes on the membrane. FIG. 23 (*a*) is the equiaxial lateral sectional view of the unit and FIG. 23 (*b*) is the exploded view of the unit. The shape and the size of the additional holes (93) on the perforated flexible membrane (86) may be chosen arbitrarily. The shapes in the present examples are respectively round, rectangular, hexagon and the triangle.

FIG. 24 is the third structural schematic drawing of the acoustic metamaterial structural units with the function of the heat-transferring enhancement in Example 7. Several elastic membranes (94) are covered on the other side of the acoustic metamaterial unit, on which several hole in different size and in different shapes are placed. Under the condition that the effect of soundproof of the acoustic metamaterial structural unit is not influenced, the turbulence intensity or the flow rate of the near flow field can be strengthened by swinging or vibration produced by excitation of the incident soundwave. FIG. 24 (*a*) is the equiaxial lateral sectional view of the unit and FIG. 24 (*b*) is the exploded view of the unit.

2. The Preparation of the First Structural Schematic Drawing of the Acoustic Metamaterial Structural Units with the Function of the Heat-Transferring Enhancement and the Acoustic Metamaterial Plate Constructed the Units in Inner Surface Direction and the Test of the Properties FIG. 25 is the testing result of the incident Sound Transmission Loss in normal direction for the sample of the first structural schematic drawing of the acoustic metamaterial structural units in Example 7. The sample photo is on the right of the Figure, and the outer diameter is 225 mm. The present example of acoustic metamaterial structural unit is improved from the Example 6 shown in FIG. 18, and four additional holes whose diameter is all 3 mm perforated on the first perforated flexible membrane (the thickness is 0.050 mm and the material is polyetherimide; and the geometric parameters and material parameters of all other composite elements is same as the Example 6. It can be seen from the figure that the spike appears in the frequency of 85 Hz and the corresponding STL value reaches to about 22 dB. The frequency bond that the STL value in the normal incident Sound Transmission Loss spectrogram is higher than 6 dB is 300 Hz~1100 Hz.

Example 8: The Preparation of the Acoustic Metamaterial Composite Structure and the Test of the Properties The acoustic metamaterial structural units in Example 1 is constructed by array distribution in inner surface direction (xy plane), and the basic acoustic metamaterial plate is formed. The glass fiber (97) whose thickness is 10 mm and the nominal flow resistivity is 19000 $Nsm^{-4}$ is chosen as the routine acoustic material plate. The acoustic metamaterial plate and the routine acoustic material plate is combined; the different acoustic plates contacts each other directly and are further slightly extruded. They can also connect by the types of elastic connection, for example, small piece of the rubber bearing is used for supporting and isolating the different acoustic material plates. Finally, the acoustic metamaterial composite structure is constructed as shown in FIG. 26. The incident Sound Transmission Loss curve testing by the acoustic impedance tube method is shown in FIG. 27. Wherein, the circle corresponds to the result of the present Example 1. The dashed line is the result of the present acoustic metamaterial structural unit in Example 8. It can be shown from the figures, comparing with the basic type of acoustic metamaterial plate, the Sound Transmission Loss in normal direction of the present acoustic composite structure sample is higher than the basic acoustic metamaterial plate except near the frequency of 440 Hz corresponding to STL spike, especially in mid- or high frequency bond on the right of STL spike. The STL value of the present acoustic composite structure sample is lightly lower than basic acoustic metamaterial plate near the frequency of 440 Hz corresponding to STL spike. The reason is that the introduction of glass fiber is equivalent to increase the structural damping of the basic acoustic metamaterial plate, and the effect of the structural damping mainly embodies the amplitude on the frequency of the gentle resonance and the reflection resonance.

Example 9: The Acoustic Metamaterial Composite Structure Constructed by Multiple Layers of Acoustic Metamaterial Plates Stacking in the Outer Vertical Direction FIG. 28 is the schematic drawing of the acoustic composite plate constructed by two layers of acoustic metamaterial plates that they are pulled so as to form a certain space in Example 9. Wherein, the structure and material parameters of the two thin layers of acoustic metamaterial plates may be same or different. They respectively comprises the first layer of acoustic metamaterial plate framework (98), the whole piece of the perforated membrane (99) of the first layer of acoustic metamaterial plate, the second layer of acoustic metamaterial plate framework (100), the whole piece of the perforated membrane (101) of the second layer of acoustic metamaterial plate. There is air gap between the two layers of the routine acoustic material plates (102).

FIG. 29 is the schematic drawing of the acoustic composite plate constructed by two layers of acoustic metamaterial plates that they are pulled so as to form a certain space, and a layer of porous material is inserted in the space in Example 9. They respectively comprises the first layer of acoustic metamaterial plate framework (98), the whole piece of the perforated membrane (99) of the first layer of acoustic metamaterial plate, the second layer of acoustic metamaterial plate framework (100), the whole piece of the perforated membrane (101) of the second layer of acoustic metamaterial plate. The characteristic impedance of the porous material layer (103) should match with the characteristic impedance of two layers of membrane, which can avoid the soundwave not entering into the porous material effectively. In the meanwhile, the influence of the filled porous material on the flexural vibration rigidity of the two layers of membrane (99) and (101) should be considered, and the operating frequency of the original designed acoustic metamaterial structural unit should be modified. Besides, the porous material layer should be perforated, which ensures the holes are coincide with the holes perforated on the frame (98) and the constraint (100) so that the heat dissipation obstacle is not caused.

FIG. 30 is the testing result of the incident Sound Transmission Loss in normal direction for the sample of the acoustic metamaterial composite plate in Example 9. The sample photo is on the right of the figure, and the outer diameter is 225 mm. The glass fiber is filled between the two layers of the acoustic metamaterial composite plates with the same structure and material parameters. Wherein, the structure parameter and the material parameter of the acoustic metamaterial plate are same as the thin and light type of the acoustic metamaterial plate in Example 2 shown in FIG. 8. The thickness of the glass fiber is 10 mm and the nominal flow resistivity is 19000 $Nsm^{-4}$. In FIG. 30, hollow box curve represents one layer of thin and light type of the acoustic metamaterial plate in Example 2; the dashed line represents the acoustic metamaterial composite plate constructed with two layers of thin and light type of the acoustic metamaterial plates filled with one layer of glass fiber whose thickness is 10 mm in the space formed between the two in Example 2. It can be seen that the STL value of the two types of the acoustic metamaterial composite plate samples lies in the frequency bond of 100 Hz~1000 Hz, which is higher than the single layer of the thin and light type of the acoustic metamaterial plate. Moreover, the effect of the increase of the STL value mainly embody the mid- and high- frequency bond on the right of the spike. From comparison the solid line and the dashed line, we can see that the spike frequency of the acoustic metamaterial composite plate sample filled with glass fiber moves to the high frequency, and the effective operating frequency bond is the widest of the three.

Example 10: The Acoustic Metamaterial Plates with the Curved Surface Structure and the Method for Assembling Thereof FIG. 31 is the schematic drawing of the acoustic metamaterial plate with the curved surface in Example 10. The acoustic metamaterial structural units (104) of the present invention are connected with wedge connector (105) to form the acoustic metamaterial plate with a certain curvature. The wedge connector (105) may be rubber, acrylic, nylon and the material of the wedge connector in the Example is rubber. The present example is especially suitable for the shell or other installment structure that a certain curvature is required.

In the end, the above-mentioned examples are preferred ones only, and are not used to limit the present invention. Those skilled in the art should understand that various modifications and transformations could be taken on the present invention. Every modification, equal alternation and improvement of the present invention within its spirits and principles should be encompassed in the protection scope of the present invention.

What is claimed is:

1. An acoustic metamaterial structural unit, comprising:

a frame, the frame having a first member and a second member, the second member opposite the first member;

a constraint placed within the frame and rigidly connected to the first and the second members of the frame, the constraint having at least one hole; and a flexible membrane covering at least one surface of the frame, the membrane having at least one hole and constrained by the constraint.

2. The acoustic metamaterial structural unit according to, wherein a shape, position, and size of the at least one hole in the constraint are the same as a shape, position, and size of the at least one hole in the membrane.

3. The acoustic metamaterial structural unit according to claim 2, wherein the size of the at least one hole in the constraint is determined by a flow rate passing through the at least one hole and by a soundproof operating frequency bond.

4. The acoustic metamaterial structural unit according to claim 3, wherein the shape of the at least one hole in the constraint is a regular symmetric geometry.

5. The acoustic metamaterial structural unit according to claim 1, wherein both a top and a bottom surfaces of the frame are covered by the.

6. The acoustic metamaterial structural unit according to claim 5, wherein a porous materials is filled within a space between the top and bottom surfaces of the frame covered by the membrane.

7. The acoustic metamaterial structural unit according to claim 1, wherein a shape of the frame is square or hexagon.

8. The acoustic metamaterial structural unit according to claim 1, wherein the constraint constrains the membrane by a linear contact, wherein the contact is regular symmetric geometry having a spherical, square or regular polygon shape.

9. The acoustic metamaterial structural unit according to claim 1, wherein a material of the frame and the constraint is selected from the list consisting of aluminum, steel, wood, rubber, plastic, glass, gypsum, cement, high molecular polymer and composite fiber.

10. An acoustic metamaterial plates structure constructed by the said acoustic metamaterial structural unit according to claim 1.

11. The acoustic metamaterial plates structure according to claim 10, wherein the acoustic metamaterial plates structure is combined and spliced in an inner plane direction by the acoustic metamaterial structural unit.

12. An acoustic metamaterial composite structure constructed by the acoustic metamaterial plates structure according to claim 10.

13. The acoustic metamaterial composite structure according to claim 12, wherein the acoustic metamaterial composite structure is stacked in layers, in an outer vertical direction of the acoustic metamaterial plates structure.

14. The acoustic metamaterial composite structure according to claim 13, wherein a space formed by the layers of the acoustic metamaterial plates structure is filled with a porous material.

15. A method for adjusting at least one operating frequency band of the acoustic metamaterial structural unit according to any of the claims 1-9, the method comprising the steps of:

adjusting the sizes and materials of the frame, the constraint and the membrane so as to adjust the at least one operating frequency band.

16. A method for assembling the acoustic metamaterial structural unit according to any of the claims 1-9, characterized that the perforated constraint and the frames are prepared by the integral forming process. The perforated constraint and the frames are prepared as prefabrications firstly, and then the prefabrication of the perforated constraint is rigidly connected with the frame prefabrication to form the unit frame structure. The membrane is covered the unit frame structure under the freely spreading conditions, and further they are rigidly contacted. Finally, the membrane is perforated. Preferably, the integral forming process is milling, casting, stamping, laser cutting or the 3D printing process. Preferably, the prefabrication of the perforated constraint and frame are prepared by the process of milling, casting, stamping, laser cutting or the 3D printing. Preferably, the rigid connection is gluing connection, hot weld connection or mechanical rivet connection.

17. A method for assembling the acoustic metamaterial plates according to claim 11, characterized in that the assembled acoustic metamaterial structural units are rigidly connected, or the assembled acoustic metamaterial structural units are combined with wedge connector to form the acoustic metamaterial plate with a certain curvature. The perforated constraint and the frames are prepared to be the whole the acoustic metamaterial frame structure by the integral forming process. The membrane is covered the unit frame structure under the freely spreading conditions, and further they are rigidly contacted. Finally, the membrane is perforated. In this case, the sizes and the thickness of the membrane for every acoustic metamaterial structural unit are same. Preferably, the unit structure unit or the whole acoustic metamaterial plate is prepared by integral forming process such as milling, casting, stamping, laser cutting or the 3D printing process. Preferably, the prefabrication of the perforated constraint and frame are prepared by the process of milling, casting, stamping, laser cutting or the 3D printing. Preferably, the rigid connection is gluing connection, hot weld connection or mechanical rivet connection.

18. A method for assembling the acoustic metamaterial composite structure according to claim 14, the porous material is made into small units, and further filled into the space formed by the frame and the constraint of the acoustic metamaterial structural unit. In the meanwhile, a whole piece of routine acoustic material plate is perforated in advance, or the whole piece of routine acoustic metamaterial plate is coordinately perforated with the said acoustic metamaterial plate. And then, they are contacted with each other and rigidly connected. Preferably, the porous material is made into small units by the constructing model, clipping or stamping. Preferably, the routine acoustic material plate directly contacts the acoustic metamaterial plate, they are contacted by supporting with the elastic cushion, so as to isolate the vibration delivery between the different acoustic material plates. Preferably, the rigid connection is gluing connection, hot weld connection or mechanical rivet connection.

* * * * *